US012627424B2

(12) United States Patent
Farag

(10) Patent No.: US 12,627,424 B2
(45) Date of Patent: May 12, 2026

(54) METHOD AND APPARATUS FOR DOWNLINK AND UPLINK CARRIER-PHASE REPORTING

(71) Applicant: Samsung Electronics Co., Ltd., Suwon-si (KR)

(72) Inventor: Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 18/300,304

(22) Filed: Apr. 13, 2023

(65) Prior Publication Data

US 2023/0344568 A1      Oct. 26, 2023

Related U.S. Application Data

(60) Provisional application No. 63/336,158, filed on Apr. 28, 2022, provisional application No. 63/336,148, filed on Apr. 28, 2022, provisional application No. 63/335,093, filed on Apr. 26, 2022.

(51) Int. Cl.
| | |
|---|---|
| *H04W 72/1268* | (2023.01) |
| *H04L 5/00* | (2006.01) |
| *H04W 64/00* | (2009.01) |

(52) U.S. Cl.
CPC ............. *H04L 5/001* (2013.01); *H04W 64/00* (2013.01)

(58) Field of Classification Search
CPC ................................ H04L 5/001; H04W 64/00
See application file for complete search history.

(56) References Cited

U.S. PATENT DOCUMENTS

| | | | |
|---|---|---|---|
| 2013/0295944 A1 | 11/2013 | Saur et al. | |
| 2019/0146052 A1 | 5/2019 | Chiu et al. | |
| 2019/0297489 A1 | 9/2019 | Lei et al. | |
| 2020/0408871 A1 | 12/2020 | Da et al. | |
| 2022/0082652 A1 | 3/2022 | Da et al. | |
| 2023/0037478 A1* | 2/2023 | Huang | ................... G01S 5/009 |
| 2024/0345201 A1* | 10/2024 | Peng | ................... G01S 5/0036 |
| 2024/0389062 A1* | 11/2024 | Xie | ................... G01S 1/0428 |

OTHER PUBLICATIONS

"5G; NR; Physical channels and modulation (3GPP TS 38.211 version 17.4.0 Release 17)", ETSI TS 138 211 V17.4.0, Jan. 2023, 141 pages.
"3rd Generation Partnership Project; Technical Specification Group Radio Access Network; NR; Multiplexing and channel coding (Release 17)", 3GPP TS 38.212 V17.5.0, Mar. 2023, 203 pages.

(Continued)

*Primary Examiner* — Kevin M Cunningham

(57) ABSTRACT

Apparatuses and methods for an uplink carrier-phase reporting. A method of operating a user equipment (UE) includes receiving, from N antennas of a base station, N downlink (DL) positioning reference signals (PRSs), respectively, and measuring carrier phase differences of the received DL PRSs corresponding to adjacent pairs of the N antennas. The DL PRSs are received in orthogonal resources and N>1. The method further includes determining a first carrier phase difference to report based on the measured carrier phase differences and reporting the first carrier phase difference to a network.

14 Claims, 15 Drawing Sheets

(56) References Cited

OTHER PUBLICATIONS

"3rd Generation Partnership Project; Technical Specification Group Radio Access Network; NR; Physical layer procedures for control (Release 17)", 3GPP TS 38.213 V17.5.0, Mar. 2023, 262 pages.

3rd Generation Partnership Project; Technical Specification Group Radio Access Network; NR; Physical layer procedures for data (Release 17), 3GPP TS 38.214 V17.5.0, Mar. 2023, 231 pages.

"3rd Generation Partnership Project; Technical Specification Group Radio Access Network; NR; Physical layer measurements (Release 17)", 3GPP TS 38.215 V17.3.0, Mar. 2023, 26 pages.

"3rd Generation Partnership Project; Technical Specification Group Radio Access Network; NR; Medium Access Control (MAC) protocol specification (Release 17)", 3GPP TS 38.321 V17.4.0, Mar. 2023, 252 pages.

"3rd Generation Partnership Project; Technical Specification Group Radio Access Network; NR; Radio Resource Control (RRC) protocol specification (Release 17)", 3GPP TS 38.331 V17.4.0, Mar. 2023, 1321 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.5.0, Mar. 2023, 584 pages.

International Search Report and Written Opinion issued Jul. 10, 2023 regarding International Application No. PCT/KR2023/005493, 8 pages.

DanKook University, "Carrier Phase Based Downlink Angle of Departure Measurement", 3GPP TSG RAN WG1 Meeting #105-e, R1-2104844, May 2021, 5 pages.

DanKook University, "Carrier Phase Based Positioning for NR", 3GPP TSG RAN WG1 Meeting #104-e, R1-2102802, Apr. 2021, 5 pages.

Extended European Search Report issued Jun. 24, 2025 regarding Application No. 23796719.5, 12 pages.

* cited by examiner

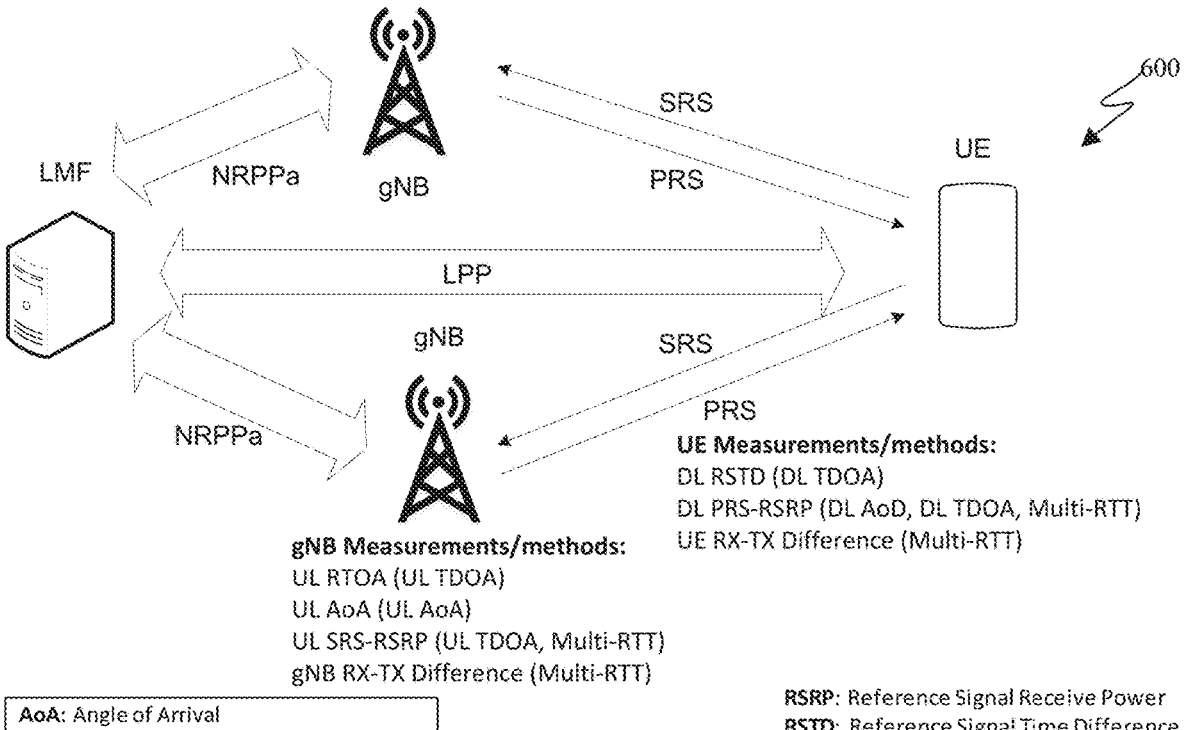

600

SRS

PRS

LMF    NRPPa    gNB    UE

LPP gNB    SRS

NRPPa    PRS

UE Measurements/methods:
DL RSTD (DL TDOA)
DL PRS-RSRP (DL AoD, DL TDOA, Multi-RTT)
UE RX-TX Difference (Multi-RTT)

gNB Measurements/methods:
UL RTOA (UL TDOA)
UL AoA (UL AoA)
UL SRS-RSRP (UL TDOA, Multi-RTT)
gNB RX-TX Difference (Multi-RTT)

AoA: Angle of Arrival
AoD: Angle of Departure
LMF: Location Management Function
LPP: LTE Positioning Protocol
NRPPa: NR Positioning Protocol annex
PRS: Positioning Reference Signal

RSRP: Reference Signal Receive Power
RSTD: Reference Signal Time Difference
RTOA: Relative Time of Arrival
RTT: Round Trip Time
SRS: Sounding Reference Signal
TDOA: Time Difference Of Arrival

FIG. 6A

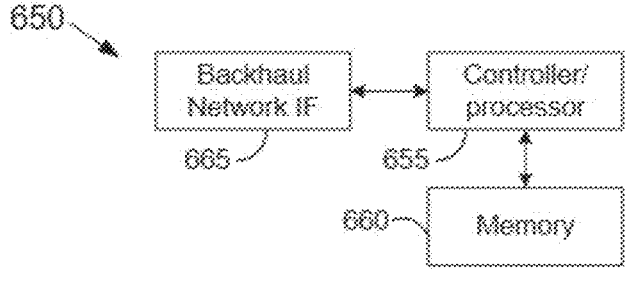

650

Backhaul Network IF    Controller/ processor 665    655

660    Memory

$\varphi$: symbol phase

800

900

$\phi_0$ and $\phi_1$ are the initial phase of each transmitter

1000

1100

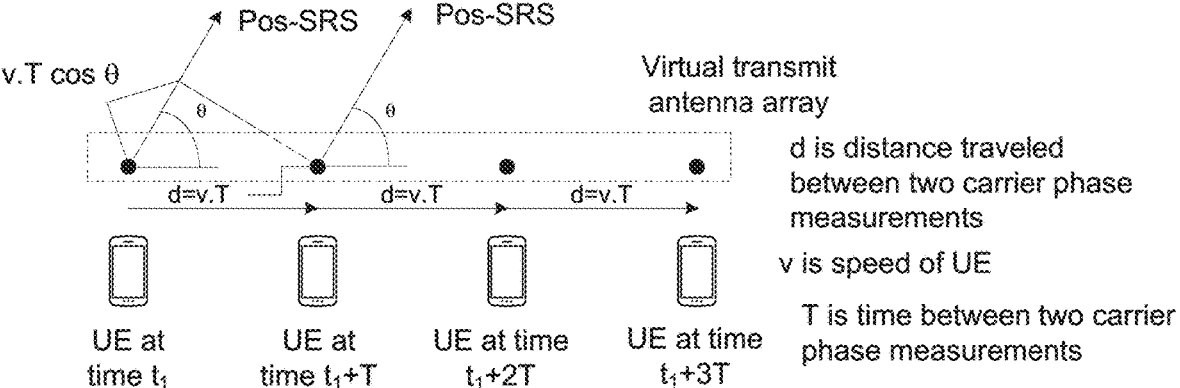
FIG. 13

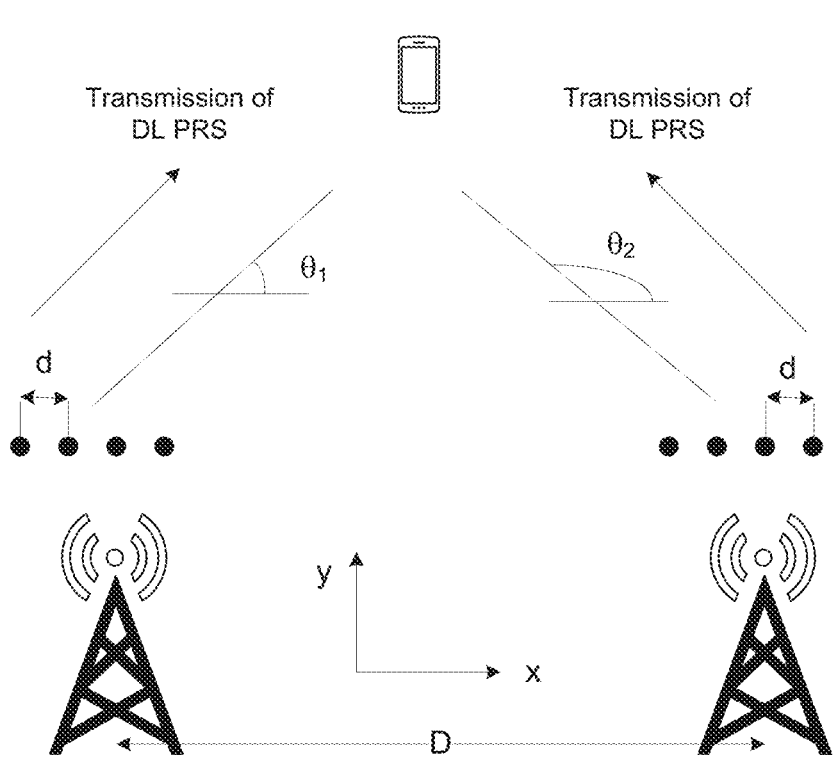
FIG. 14

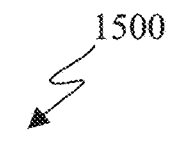
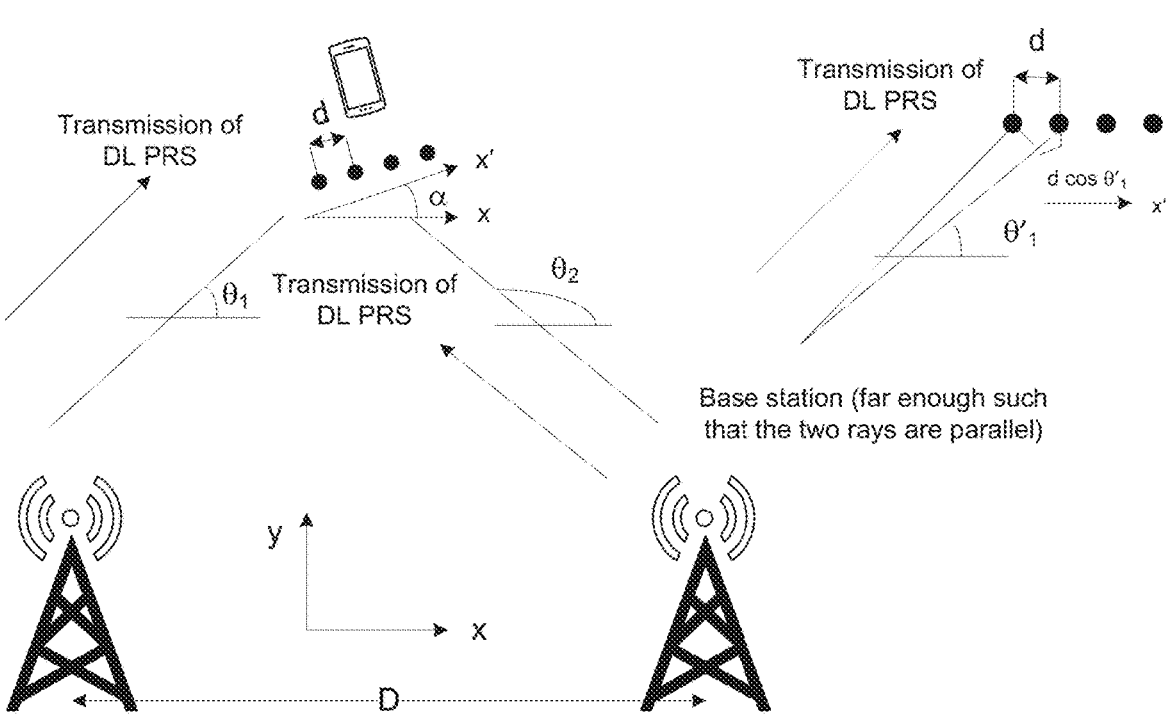
FIG. 15

1600
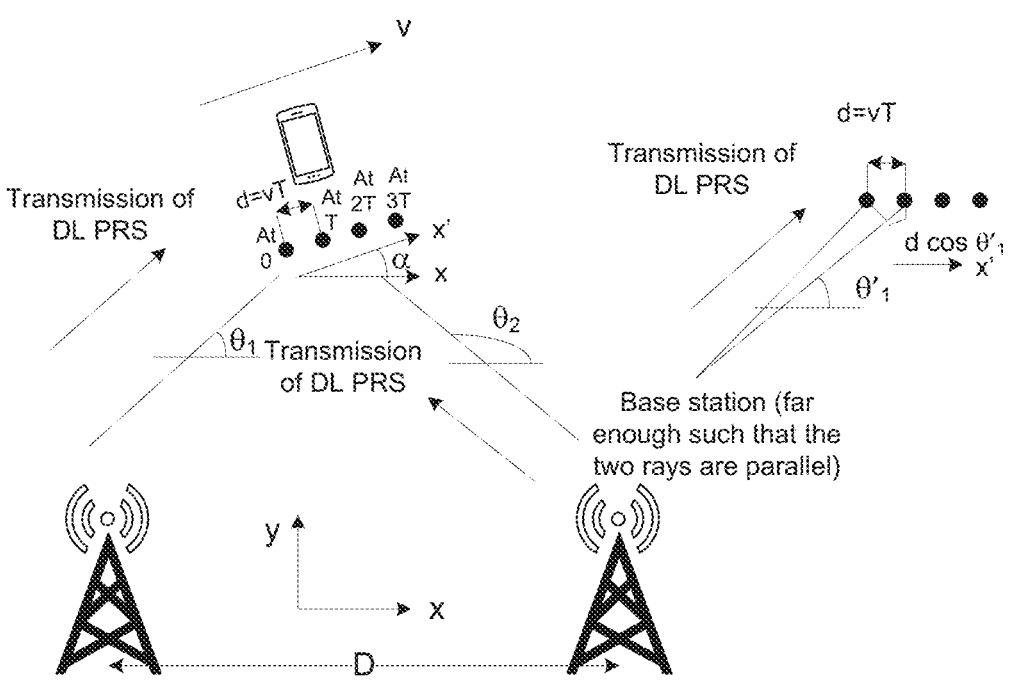
FIG. 16

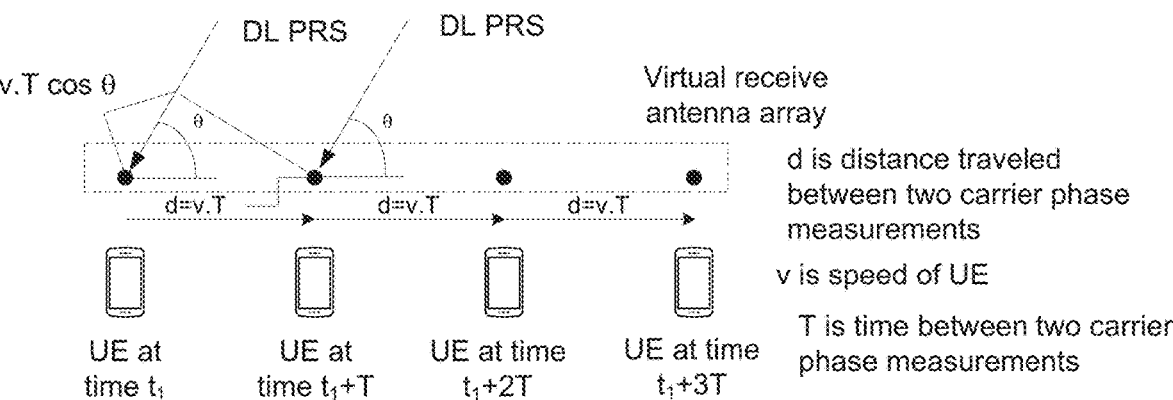
FIG. 17

1800

1900

METHOD AND APPARATUS FOR DOWNLINK AND UPLINK CARRIER-PHASE REPORTING

CROSS-REFERENCE TO RELATED APPLICATION AND CLAIM OF PRIORITY

This application claims priority under 35 U.S.C. § 119(e) to U.S. Provisional Patent Application No. 63/335,093 filed on Apr. 26, 2022, U.S. Provisional Patent Application No. 63/336,148 filed on Apr. 28, 2022, and U.S. Provisional Patent Application No. 63/336,158 filed on Apr. 28, 2022. The above-identified provisional patent applications are hereby incorporated by reference in their entirety.

TECHNICAL FIELD

The present disclosure relates generally to wireless communication systems and, more specifically, to a method and apparatus for downlink and uplink carrier-phase reporting.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for downlink and uplink carrier-phase.

In one embodiment, a user equipment (UE) is provided. The UE includes a transceiver configured to receive, from N antennas of a base station, N downlink (DL) positioning reference signals (PRSs), respectively. The DL PRSs are received in orthogonal resources and N>1. The UE further includes a processor operably coupled to the transceiver. The processor is configured to measure carrier phase differences of the received DL PRSs corresponding to adjacent pairs of the N antennas and determine a first carrier phase difference to report based on the measured carrier phase differences. The transceiver is further configured to report the first carrier phase difference to a network.

In another embodiment, a base station (BS) is provided. The BS includes a transceiver configured to receive, from M antennas of a user equipment, M sounding reference signals (SRSs), respectively. The SRSs are received in orthogonal resources and M>1. The BS further includes a processor operably coupled to the transceiver. The processor is configured to measure carrier phase differences of the received SRSs corresponding to adjacent pairs of the M antennas, determine a first carrier phase difference to report based on the measured carrier phase differences, and report the first carrier phase difference to a location management function (LMF).

In yet another embodiment, a method of operating a UE is provided. The method includes receiving, from N antennas of a base station, N DL PRSs, respectively, and measuring carrier phase differences of the received DL PRSs corresponding to adjacent pairs of the N antennas. The DL PRSs are received in orthogonal resources and N>1. The method further includes determining a first carrier phase difference to report based on the measured carrier phase differences and reporting the first carrier phase difference to a network.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6A illustrates a positioning architecture according to embodiments of the present disclosure;

FIG. 6B illustrates an example location management function (LMF) according to embodiments of the present disclosure;

FIG. 13 illustrates an example of a virtual transmit antenna array as result of the UE's mobility according to embodiments of the present disclosure;

FIG. 14 illustrates an example of reception of the downlink (DL) positioning reference signal according to embodiments of the present disclosure;

FIG. 15 illustrates an example of reception of the DL positioning reference signal according to embodiments of the present disclosure;

FIG. 16 illustrates an example of reception of the DL positioning reference signal according to embodiments of the present disclosure;

FIG. 17 illustrates an example of a virtual receive antenna array as result of the UE's mobility according to embodiments of the present disclosure;

DETAILED DESCRIPTION

Figure 1:
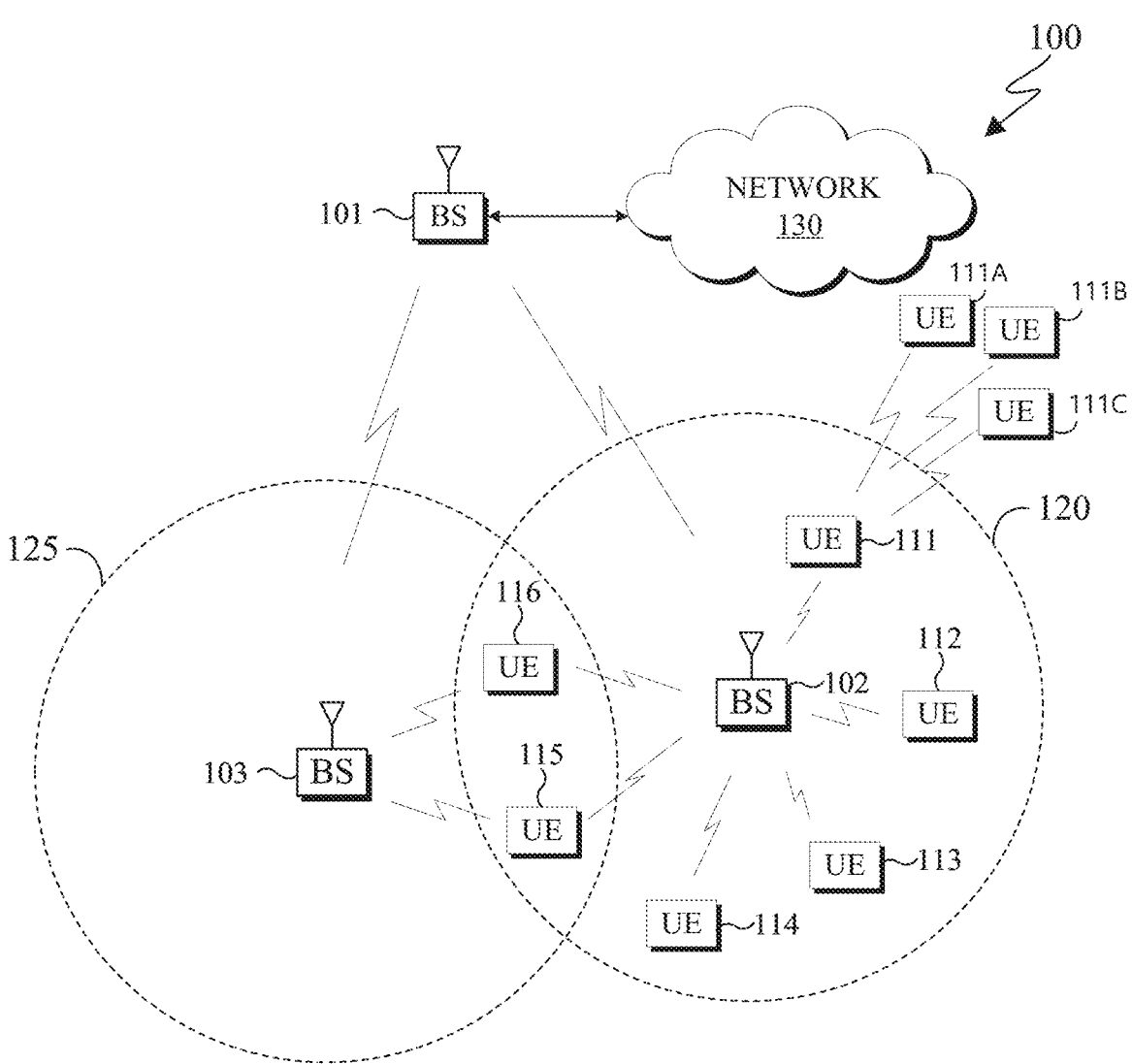
FIG. 1 illustrates an example wireless network according to embodiments of the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.4.0, "NR; Physical channels and modulation" (herein "REF 1"); 3GPP TS 38.212 v17.5.0, "NR; Multiplexing and Channel coding" (herein "REF 2"); 3GPP TS 38.213 v17.5.0, "NR; Physical Layer Procedures for Control" (herein "REF 3"); 3GPP TS 38.214 v17.5.0, "NR; Physical Layer Procedures for Data" (herein "REF 4"); 3GPP TS 38.215 v17.3.0, "NR; Physical Layer Measurements" (herein "REF 5"); 3GPP TS 38.321 v17.4.0, "NR; Medium Access Control (MAC) protocol specification" (herein "REF 6"); 3GPP TS 38.331 v17.4.0, "NR; Radio Resource Control (RRC) Protocol Specification" (herein "REF 7"); 3GPP TS 36.213 v17.5.0, "Evolved Universal Terrestrial Radio Access (E-UTRA); Physical layer procedures" (herein "REF 8").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation, radio access technology (RAT)-dependent positioning and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
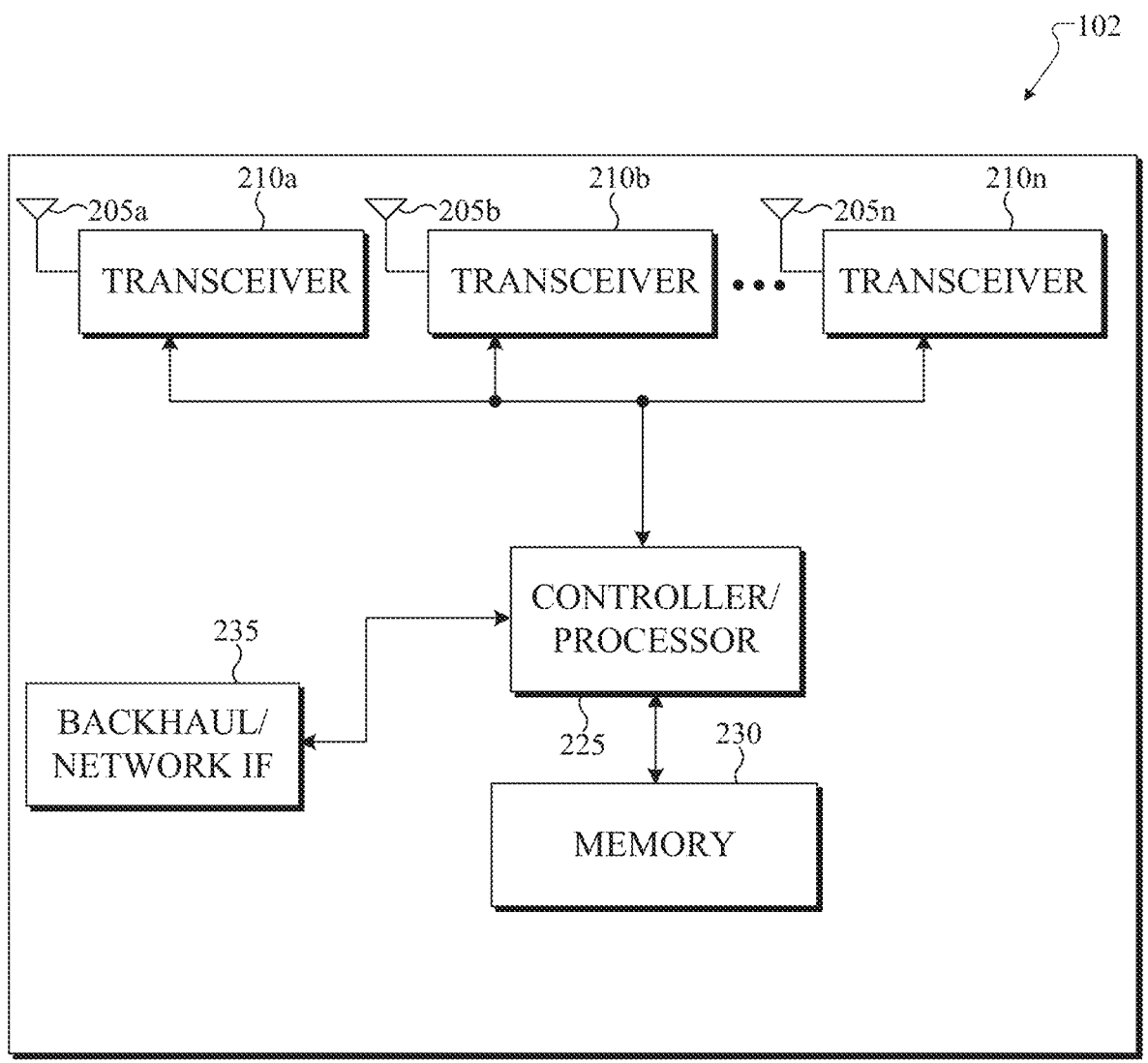
FIG. 2 illustrates an example gNodeB (gNB) according to embodiments of the present disclosure.
Figure 3:
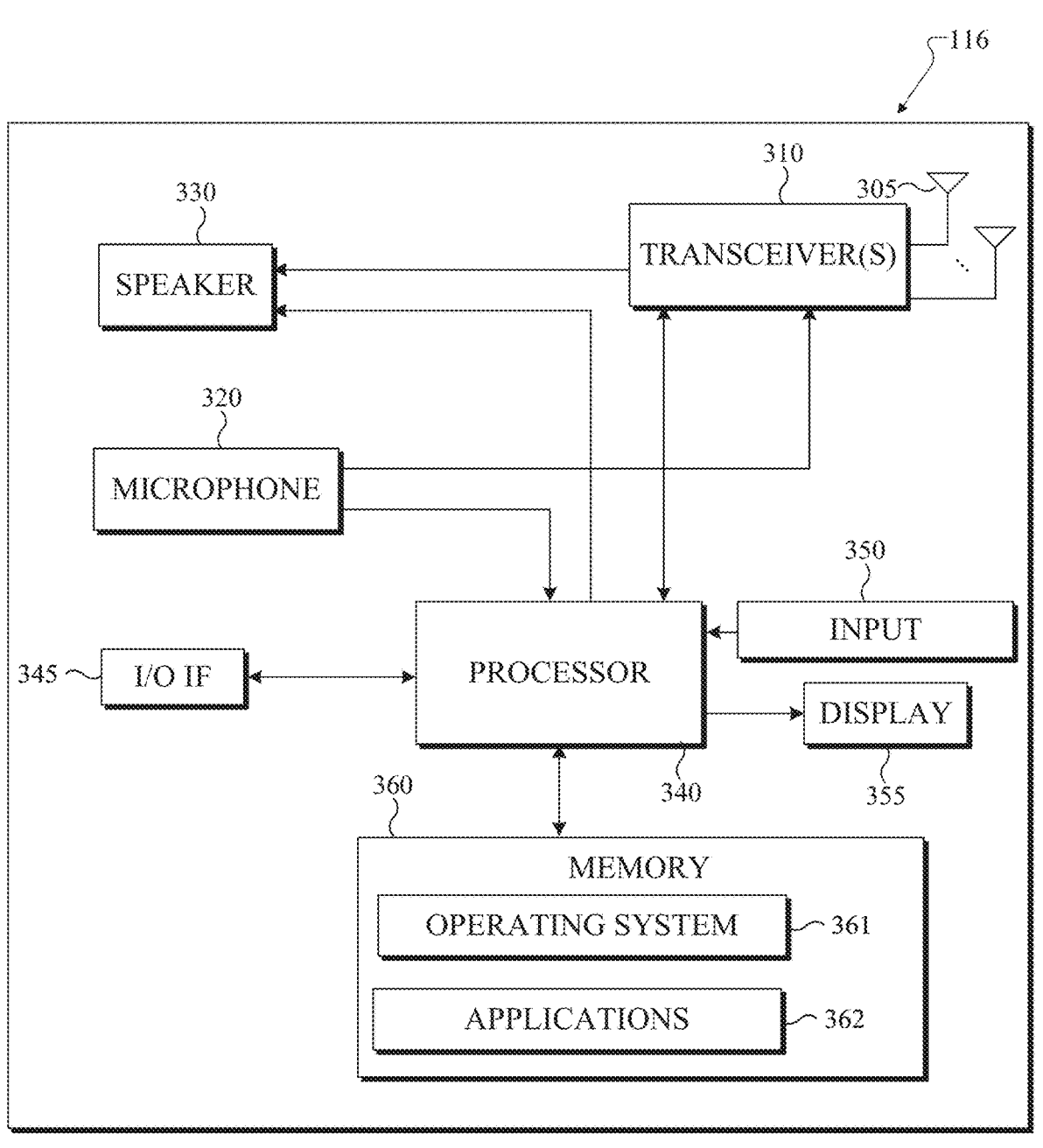
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM)

or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UEs are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting downlink and uplink carrier-phase reporting. In certain embodiments, one or more of the BSs 101-103 include circuitry, programing, or a combination thereof for supporting downlink and uplink carrier-phase reporting.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UEs 111A to 111C) that may have a sidelink (SL) communication with the UE 111. The UE 111 can communicate directly with the UEs 111A to 111C through a set of SLs (e.g., SL interfaces) to provide sidelink communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication and/or positioning with their other UEs (such as UEs 111A to 111C as for UE 111).

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNB s come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channels and/or signals and the transmission of DL channels and/or signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for a downlink and/or uplink carrier-phase reporting. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channels and/or signals and the transmission of UL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for downlink carrier-phase reporting. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
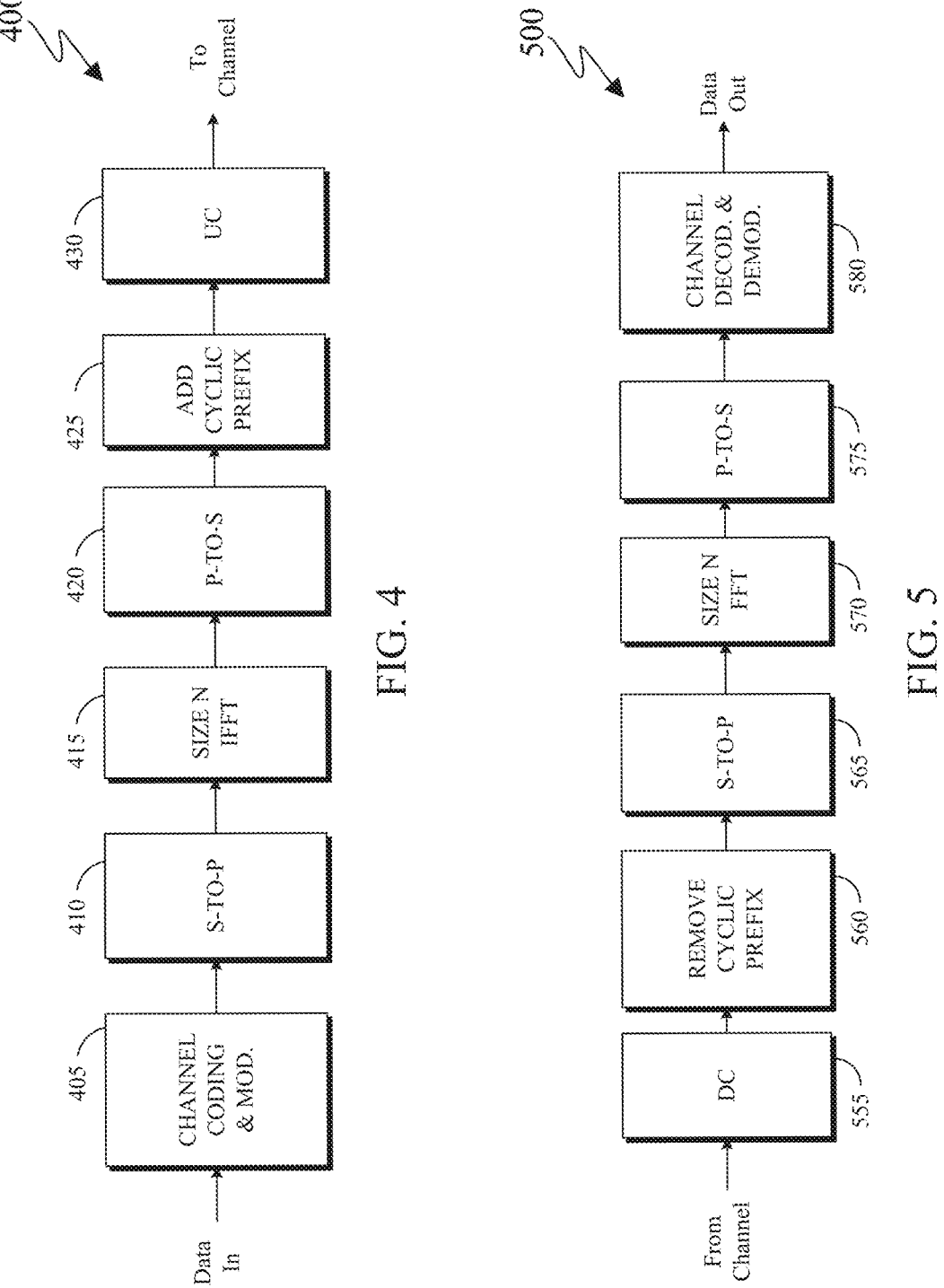
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A time unit for DL signaling, for UL signaling, or for SL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems (see also REF 1). In addition, a slot can have symbols for SL communications and/or SL positioning. A UE can be configured one or more bandwidth parts (BWPs) of a system BW for transmissions or receptions of signals or channels.

FIG. 6A illustrates a positioning architecture 600 according to embodiments of the present disclosure. The embodiment of the positioning architecture 600 illustrated in FIG. 6A is for illustration only. FIG. 6A does not limit the scope of this disclosure to any particular implementation of the positioning architecture 600.

NR supports positioning on the Uu interface. In the DL, positioning reference signal (PRS) can be transmitted by a gNB to a UE to enable the UE to perform positioning measurements. In the UL, a UE can transmit positioning sounding reference signal (SRS) to enable a gNB to perform positioning measurements. UE measurements for positioning include; DL PRS reference signal received power (DL PRS RSRP), DL PRS reference signal received path power (DL PRS RSRPP), DL reference signal time difference (DL RSTD), UE Rx-Tx time difference, NR enhanced cell ID (E-CID) DL SSB radio resource management (RRM) measurement, and NR E-CID DL CSI-RS RRM measurement. NG-RAN measurements for positioning include; UL relative time of arrival (UL-RTOA), UL angle of arrival (UL AoA), UL SRS reference signal received power (UL SRS-RSRP), UL SRS reference signal received path power (UL SRS-RSRPP) and gNB Rx-Tx time difference. NR introduced several radio access technology (RAT) dependent positioning methods; time difference of arrival based methods such DL time difference of arrival (DL-TDOA) and UL time difference of arrival (UL TDOA), angle based methods such as UL angle of arrival (UL AoA) and DL angle of departure (DL AoD), multi-round trip time (RTT) based methods and E-CID based methods.

Positioning schemes can be UE-based, i.e., the UE determines the location or UE-assisted (e.g., location management function (LMF) based), i.e., UE provides measurements for a network entity (e.g., LMF) to determine the location, or NG-RAN node assisted (i.e., NG-RAN node such as gNB provides measurement to LMF). LTE positioning protocol (LPP) [as illustrated in 3GPP TS 37.355], first introduce for LTE and then extended to NR is used for communication between the UE and LMF. NR positioning protocol annex (NRPPa) [as illustrated in 3GPP TS 38.455] is used for communication between the gNB and the LMF. FIG. 6 illustrates the overall positioning architecture along with positioning measurements and methods.

FIG. 6B illustrates an example LMF 650 according to embodiments of the present disclosure. The embodiment of the LMF 650 shown in FIG. 6B is for illustration only. However, LMFs come in a wide variety of configurations, and FIG. 6B does not limit the scope of this disclosure to any particular implementation of an LMF.

As shown in FIG. 6B, the LMF 650 includes a controller/processor 655, a memory 660, and a backhaul or network interface 665. The controller/processor 655 can include one or more processors or other processing devices that control the overall operation of the LMF 650. For example, the controller/processor can support functions related to positioning and location services or downlink and uplink carrier-phase reporting. Any of a wide variety of other functions can be supported in the LMF 650 by the controller/processor 655. In some embodiments, the controller/processor 655 includes at least one microprocessor or microcontroller.

The controller/processor 655 is also capable of executing programs and other processes resident in the memory 660, such as a basic OS. In some embodiments, the controller/processor 655 supports communications between entities, such as gNB 102 and UE 116 and supports protocols such as LPP and NRPPA. The controller/processor 655 can move data into or out of the memory 660 as required by an executing process.

The controller/processor 655 is also coupled to the backhaul or network interface 665. The backhaul or network interface 665 allows the LMF 650 to communicate with other devices or systems over a backhaul connection or over a network. The interface 665 can support communications over any suitable wired or wireless connection(s). For example, when the LMF 650 is implemented as part of a cellular communication system or wired or wireless local area network (such as one supporting 5G, LTE, or LTE-A), the interface 665 can allow the LMF 650 to communicate with gNBs or eNBs or other network elements over a wired or wireless backhaul connection. The interface 665 includes any suitable structure supporting communications over a wired or wireless connection, such as an Ethernet or RF transceiver.

The memory 660 is coupled to the controller/processor 655. Part of the memory 660 can include a RAM, and another part of the memory 660 can include a Flash memory or other ROM. In certain embodiments, a plurality of instructions, such as a location management algorithm is stored in memory 660. The plurality of instructions is configured to cause the controller/processor 655 to perform location management process and to receive downlink and/or uplink carrier-phase reporting.

SL signals and channels are transmitted and received on sub-channels within a resource pool, where a resource pool is a set of time-frequency resources used for SL transmission and reception within a SL BWP. SL channels include physical SL shared channels (PSSCHs) conveying data information and second stage/part SL control information (SCI), physical SL control channels (PSCCHs) conveying first stage/part SCI for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, PSFCHs can also convey conflict information, and physical SL Broadcast channel (PSBCH) conveying system information to assist in SL synchronization. SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. SCI can include two parts/ stages corresponding to two respective SCI formats where, for example, the first SCI format is multiplexed on a PSCCH and the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information from one UE to a group of UEs within a (pre-) configured set. In a broadcast mode, a PSCCH/PSSCH conveys SL information from one UE to all surrounding UEs. In NR release 16, there are two resource allocation modes for a PSCCH/PSSCH transmission. In resource allocation mode 1, a gNB schedules a UE on the SL and conveys scheduling information to the UE transmitting on the SL through a DCI format (e.g., DCI Format 3_0). In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a UE can be (pre-)configured one of two options for reporting of HARQ-ACK information by the UE:

HARQ-ACK reporting option (1): A UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB.

HARQ-ACK reporting option (2): A UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In HARQ-ACK reporting option (1), when a UE that transmitted the PSSCH detects a NACK in a PSFCH reception, the UE can transmit another PSSCH with the TB (retransmission of the TB). In HARQ-ACK reporting option (2) when a UE that transmitted the PSSCH does not detect an ACK in a PSFCH reception, such as when the UE detects a NACK or does not detect a PSFCH reception, the UE can transmit another PSSCH with the TB.

A sidelink resource pool includes a set/pool of slots and a set/pool of RBs used for sidelink transmission and sidelink reception. A set of slots which belong to a sidelink resource pool can be denoted by $$\{t_0'^{SL}, t_1'^{SL}, t_2'^{SL}, \ldots, t_{T'_{MAX}-1}'^{SL}\}$$

and can be configured, for example, at least using a bitmap. Where, $T'_{MAX}$ is the number of SL slots in a resource pool in 1024 frames. Within each slot $$t_y'^{SL}$$

of a sidelink resource pool, there are $N_{subCH}$ contiguous sub-channels in the frequency domain for sidelink transmission, where $N_{subCH}$ is provided by a higher-layer parameter. Subchannel m, where m is between 0 and $N_{subCH}-1$, is given by a set of $n_{subCHsize}$ contiguous PRBs, given by $n_{PRB}=n_{subCHstart}+m\cdot n_{subCHsize}+j$, where $j=0, 1, \ldots, n_{subCHsize}-1$, $n_{subCHstart}$ and $n_{subCHsize}$ are provided by higher layer parameters.

For resource (re-)selection or re-evaluation in slot n, a UE can determine a set of available single-slot resources for transmission within a resource selection window $[n+T_1, n+T_2]$, such that a single-slot resource for transmission, $R_{x,y}$ is defined as a set of $L_{subCH}$ contiguous subchannels x+i, where $i=0, 1, \ldots L_{subCH}-1$ in slot $$t_y^{SL}.$$

$T_1$ is determined by the UE such that, $$0 \leq T_1 \leq T_{proc,1}^{SL},$$

where $$T_{proc,1}^{SL}$$

is a PSSCH processing time for example as defined in REF 4. $T_2$ is determined by the UE such that $T_{2min} \leq T_2 \leq$ Remaining Packet Delay Budget, as long as $T_{2min} <$ Remaining Packet Delay Budget, else $T_2$ is equal to the Remaining Packet Delay Budget. $T_{2min}$ is a configured by higher layers and depends on the priority of the SL transmission.

The resource (re-)selection is a two-step procedure:

The first step, (e.g., performed in the physical layer) is to identify the candidate resources within a resource selection window. Candidate resources are resources that belong to a resource pool, but exclude resources (e.g., resource exclusion) that were previously reserved, or potentially reserved by other UEs. The resources excluded are based on SCIs decoded in a sensing window and for which the UE measures a SL RSRP that exceeds a threshold. The threshold depends on the priority indicated in a SCI format and on the priority of the SL transmission. Therefore, sensing within a sensing window involves decoding the first stage SCI, and measuring the corresponding SL RSRP, wherein the SL RSRP can be based on PSCCH DMRS or PSSCH DMRS. Sensing is performed over slots where the UE doesn't transmit SL. The slots excluded are based on reserved transmissions or semi-persistent transmissions that can collide with the excluded resources or any of reserved or semi-persistent transmissions. The identified candidate resources after resource exclusion are provided to higher layers.

The second step (e.g., preformed in the higher layers) is to select or re-select a resource from the identified candidate resources.

During the first step of the resource (re-)selection procedure, a UE can monitor slots in a sensing window $[n-T_0, n-T_{proc,0})$, where the UE monitors slots belonging to a corresponding sidelink resource pool that are not used for the UE's own transmission. To determine a candidate single-slot resource set to report to higher layers, a UE excludes (e.g., resource exclusion) from the set of available single-slot resources for SL transmission within a resource pool and within a resource selection window, the following:

1. Single slot resource $R_{x,y}$, such that for any slot $$t_m^{SL}$$

not monitored within the sensing window with a hypothetical received SCI Format 1-0, with a "Resource reservation period" set to any periodicity value allowed by a higher layer parameter reseverationPeriodAllowed, and indicating all sub-channels of the resource pool in this slot, satisfies condition 1 below.

2. Single slot resource $R_{x,y}$, such that for any received SCI within the sensing window 1. The associated L1-RSRP measurement is above a (pre-)configured SL-RSRP threshold, where the SL-RSRP threshold depends on the priority indicated in the received SCI and that of the SL transmission for which resources are being selected.

2. (Condition 1) The received SCI in slot $$t_m^{SL},$$

or if "Resource reservation field" is present in the received SCI the same SCI is assumed to be received in slot $$t_{m+q\times P'_{rsvp\_Rx}}^{SL},$$

indicates a set of resource blocks that overlaps $$R_{x,y+j\times P'_{rsvp\_Tx}}.$$

where,
q=1, 2, . . . , Q, where,
If $P_{rsvp\_RX}\leq T_{scal}$ and $n'-m<P_{rsvp\_Rx}'\rightarrow$ $$\text{If } P_{rsvp\_RX} \leq T_{scal} \text{ and } n' - m < P'_{rsvp\_Rx} \rightarrow Q = \left\lceil \frac{T_{scal}}{P_{rsvp\_RX}} \right\rceil \cdot T_{scal}$$

is $T_2$ in units of milli-seconds.
Else Q=1
If n belongs to $$(t_0^{SL}, t_1^{SL}, \dots , t_{T_{max}}^{SL}),$$

n'=n, else n' is the first slot after slot n belonging to set $$(t_0^{SL}, t_1^{SL}, \dots , t_{T_{max}}^{SL}).$$

j=0, 1, . . . , $C_{resel}$−1
$P_{rsvp\_RX}$ is the indicated resource reservation period in the received SCI in physical slots, and $$P'_{rsvp\_Rx}$$

is that value converted to logical slots.

$$P'_{rsvp\_Tx}$$

is the resource reservation period of the SL transmissions for which resources are being reserved in logical slots.

3. If the candidate resources are less than a (pre-)configured percentage, such as 20% of the total available resources within the resource selection window, the (pre-)configured SL-RSRP thresholds are increased by a predetermined amount, such as 3 dB.

NR sidelink introduced two new procedures for mode 2 resource allocation; re-evaluation and pre-emption.

Re-evaluation check occurs when a UE checks the availability of pre-selected SL resources before the resources are first signaled in an SCI Format, and if needed re-selects new SL resources. For a pre-selected resource to be first-time signaled in slot m, the UE performs a re-evaluation check at least in slot m−T₃. The re-evaluation check includes:

Performing the first step of the SL resource selection procedure [38.214 section 8.1.4], which involves identifying a candidate (available) sidelink resource set in a resource selection window as previously described.

If the pre-selected resource is available in the candidate sidelink resource set, the resource is used/signaled for sidelink transmission.

Else, the pre-selected resource is not available in the candidate sidelink resource set, a new sidelink resource is re-selected from the candidate sidelink resource set.

Pre-emption check occurs when a UE checks the availability of pre-selected SL resources that have been previously signaled and reserved in an SCI Format, and if needed re-selects new SL resources. For a pre-selected and reserved resource to be signaled in slot m, the UE performs a pre-emption check at least in slot m−T₃. When pre-emption check is enabled by higher layers, pre-emption check includes:

Performing the first step of the SL resource selection procedure [38.214 section 8.1.4], which involves identifying candidate (available) sidelink resource set in a resource selection window as previously described.

If the pre-selected and reserved resource is available in the candidate sidelink resource set, the resource is used/signaled for sidelink transmission.

Else, the pre-selected and reserved resource is NOT available in the candidate sidelink resource set. The resource is excluded from the candidate resource set due to an SCI, associated with a priority value $P_{RX}$, having an RSRP exceeding a threshold. Let the priority value of the sidelink resource being checked for pre-emption be $P_{TX}$.

If the priority value $P_{RX}$ is less than a higher-layer configured threshold and the priority value $P_{RX}$ is less than the priority value $P_{TX}$. The pre-selected and reserved sidelink resource is pre-empted. A new sidelink resource is re-selected from the candidate sidelink resource set. Note that, a lower priority value indicates traffic of higher priority.

Else, the resource is used/signaled for sidelink transmission.

The positioning solutions proposed for release 16 target the following commercial requirements for commercial applications:

| Requirement characteristic | Requirement target |
|---|---|
| Horizontal Positioning Error | Indoor: 3 m for 80% of the UEs<br>Outdoor: 10 m for 80% of the UEs |
| Vertical Positioning Error | Indoor: 3 m for 80% of the UEs<br>Outdoor: 3 m for 80% of the UEs |
| End to end latency | Less than 1 second |

To meet these requirements, radio access technology (RAT)-dependent, RAT independent, and a combination of RAT-dependent and RAT independent positioning schemes have been considered. For the RAT-dependent positioning schemes, timing based positioning schemes as well as angle-based positioning schemes have been considered. For timing based positioning schemes, NR supports DL Time Difference of Arrival (DL-TDOA), using positioning reference signals (PRS) for time of arrival measurements. NR also supports UL Time Difference of Arrival (UL-TDOA), using sounding reference signals (SRS) for time of arrival measurements.

NR also supports round-trip time (RTT) with one or more neighboring gNB s or transmission/reception points (TRPs). For angle based positioning schemes, NR exploits the beam-based air interface, supporting downlink angle of departure (DL-AoD), as well as uplink angle of arrival (UL-AoA). Furthermore, NR supports enhanced cell-ID (E-CID) based positioning schemes. RAT independent positioning schemes can be based on global navigation satellite systems (GNSS), WLAN (e.g., WiFi), Bluetooth, Terrestrial Beacon System (TBS), as well as sensors within the UE such as accelerometers, gyroscopes, magnetometers, etc. Some of the UE sensors are also known as Inertial Measurement Unit (IMU).

As NR expands into new verticals, there is a need to provide improved and enhanced location capabilities to meet various regulatory and commercial positioning requirements. 3GPP SA1 considered the service requirements for high accuracy positioning in TS 22.261 and identified seven service levels for positioning, with varying levels of accuracy (horizontal accuracy and vertical accuracy), positioning availability, latency requirement, as well as positioning type (absolute or relative).

One of the positioning service levels is relative positioning (see table 7.3.2.2-1 of TS 22.261), with a horizontal and vertical accuracy of 0.2 m, availability of 99%, latency of 1 sec, and targeting indoor and outdoor environments with speed up to 30 km/hr and distance between UEs or a UE and a 5G positioning node of 10 m.

Rel-17 further enhanced the accuracy, latency, reliability and efficiency of positioning schemes for commercial and IIoT applications. Targeting to achieve sub-meter accuracy with a target latency less than 100 ms for commercial applications, and accuracy better than 20 cm with a target latency in the order of 10 ms for IIoT applications.

In Rel-17, RAN undertook a study item for in-coverage, partial coverage and out-of-coverage NR positioning use cases [RP-201518]. The study focused on identifying positioning use cases and requirements for V2X and public safety as well as identifying potential deployment and operation scenarios. The outcome of the study item is included in TR 38.845. V2X positioning requirements depend on the service the UE operates, and are applicable to absolute and relative positioning. Use cases include indoor, outdoor and tunnel areas, within network coverage or out of network coverage; as well as positioning with GNSS-based positioning available, or GNSS-based positioning not available, or not accurate enough; and positioning with UE speeds up to 250 km/h. There are three sets of requirements for V2X use cases; the first with horizontal accuracy in the 10 to 50 m range, the second with horizontal accuracy in the 1 to 3 m range, and the third with horizontal accuracy in the 0.1 to 0.5 m range. The 5G system can also support determining the velocity of a UE with a speed accuracy better that 0.5 m/s and a 3-Dimension direction accuracy better than 5 degrees. Public safety positioning is to be supported indoor and outdoor, with in network coverage or out of network coverage; as well as with GNSS-based positioning available, or not available, or not accurate enough. Public safety positioning use case target a 1-meter horizontal accuracy and a vertical accuracy of 2 m (absolute) or 0.3 m (relative).

In terms of deployment and operation scenarios, TR 38.845 has identified the following:

For network coverage: In-network coverage, partial network coverage as well as out-of-network coverage. In addition to scenarios with no GNSS and no network coverage.

Radio link: Uu interface (UL/DL interface) based solutions, PC5 interface (SL interface) based solutions and their combinations (hybrid solutions). As well as RAT-independent solutions such as GNSS and sensors.

Positioning calculation entity: Network-based positioning when the positioning estimation is performed by the network and UE-based positioning when the positioning estimation is performed by the UE.

UE Type: For V2X UEs, this can be a UE installed in a vehicle, a roadside unit (RSU), or a vulnerable road user (VRU). Some UEs can have distributed antennas, e.g., multiple antenna patterns that can be leveraged for positioning. UEs can have different power supply limitations, for example VRUs or handheld UEs have limited energy supply compared to other UEs.

Spectrum: This can include licensed spectrum and unlicensed spectrum for the Uu interface and the PC5 interface; as well as ITS-dedicated spectrum for the PC5 interface.

To meet the tighter accuracy requirements and the support both the Uu interface as well as the PC5 interface for absolute and relative positioning, various embodiments of the present disclosure propose using a carrier phase method for positioning.

A single ray of a radio wave propagating in space can be described as:

$$\psi(t, r) = A \cos(wt - k \cdot r + \varphi) \tag{1}$$

Equation (1) can alternatively be written as: $(t,r)=A \cos(k \cdot r - wt + \varphi)$ where, t is time;

r is the position vector;

w is the angular frequency, related to wave frequency f by; $w=2\pi f$;

k is the wave vector, which is related to the wave number k by $k=|k|$. k is related to the wavelength of the wave, $\lambda$, by $k=2\pi/\lambda$;

A is the amplitude of the wave, in general can be a function of time t and position; and $\varphi$ is an initial phase at $t=0$ and $r=0$.

Figure 7:
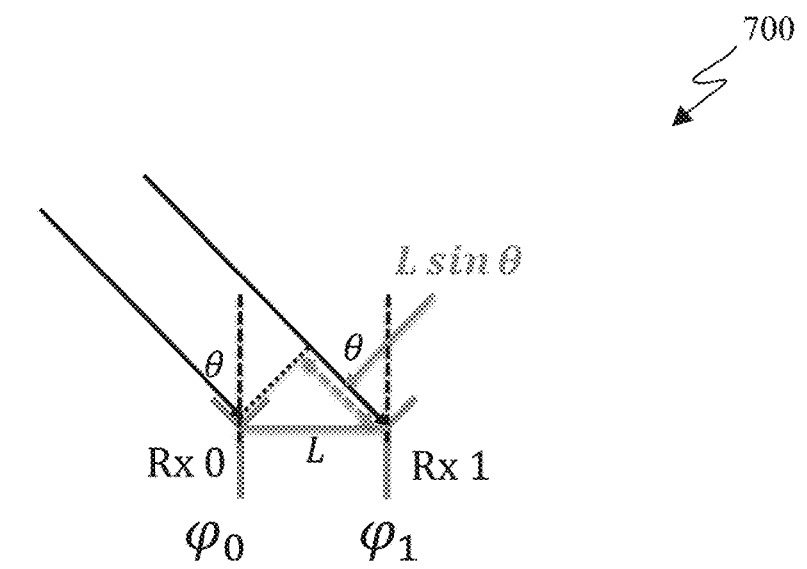
FIG. 7 illustrates an example of a phase difference between two rays according to embodiments of the present disclosure.

FIG. 7 illustrates an example of a phase difference between two rays 700 according to embodiments of the present disclosure. The embodiment of the phase difference between two rays 700 illustrated in FIG. 7 is for illustration only. FIG. 7 does not limit the scope of this disclosure to any particular implementation of the phase difference between two rays 700.

Consider rays that travel parallel, as shown in FIG. 7, the wave front is a plane perpendicular to the direction of the wave. To reach Rx1, the wave travels an extra distance L sin θ. Hence, there is a phase lag at Rx1 compared to Rx0 by $$\frac{2\pi}{\lambda} L \sin \theta.$$

If the signal $S_0$ at Rx0 is $S_0 = A_0 \cos \varphi_0$, the signal at Rx1 is $$S_1 = A_1 \cos \varphi_1 = A_1 \cos\left(\varphi_0 - \frac{2\pi}{\lambda} L \sin \theta\right).$$

Note that this result can also be determined based on equation (1), in this example, in 2-Dimension (i.e., x and y plane)

$$k = \frac{2\pi}{\lambda} (\sin \theta \, \hat{a}_x - \cos \theta \, \hat{a}_y),$$

where $\hat{\alpha}_x$ is a unit vector in the x-axis direction and $\hat{\alpha}_y$ is a unit vector in the y-axis direction. Taking Rx0 as point (0,0), and Rx1 as point (L, 0). According to equation (1), the wave at Rx0 is $A_0 \cos(wt+\varphi)$, wherein $\varphi_0 = wt + \varphi$ and at the wave at Rx1 is $$A_1 \cos\left(wt - \frac{2\pi}{\lambda} L \sin \theta + \varphi\right),$$

wherein $$\varphi_1 = wt + \varphi - \frac{2\pi}{\lambda} L \sin \theta = \varphi_0 - \frac{2\pi}{\lambda} L \sin \theta.$$

Therefore, by measuring the phase of the signal at Rx0 and comparing to the phase of the signal at Rx1 at the same time, we can get the direction of travel $\theta$ $$\theta = \arcsin \frac{(\varphi_0 - \varphi_1)\lambda}{2\pi L}.$$

Figure 8:
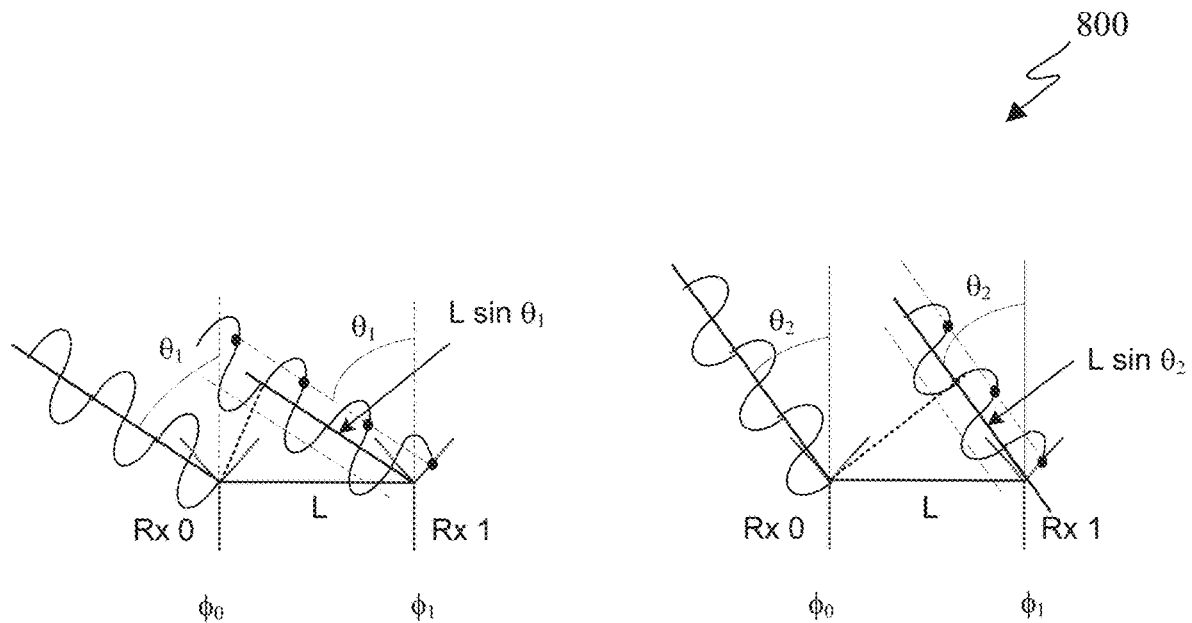
FIG. 8 illustrates an example of a phase difference between two rays according to embodiments of the present disclosure.

FIG. 8 illustrates an example of a phase difference between two rays 800 according to embodiments of the present disclosure. The embodiment of the phase difference between two rays 800 illustrated in FIG. 8 is for illustration only. FIG. 8 does not limit the scope of this disclosure to any particular implementation of the phase difference between two rays 800.

If the distance between Rx0 and Rx1 is less than or equal to $\lambda/2$, i.e., $L \leq \lambda/2$, each phase difference can be mapped to at most one $\theta$. For example, when $L = \lambda/2$, $$\theta = \arcsin \frac{(\varphi_0 - \varphi_1)}{\pi} \text{ or } (\varphi_0 - \varphi_1) = \pi \sin \theta,$$

and $\varphi_0 - \varphi_1$ is within the range of $-\pi$ to $\pi$. If L exceeds $\lambda/2$, multiple $\theta$ values can give the same phase difference ($\varphi_0 - \varphi_1$) (modulo $2\pi$). For example, take $$L = \lambda, \theta = \arcsin \frac{(\varphi_0 - \varphi_1)}{2\pi} \text{ or } (\varphi_0 - \varphi_1) = 2\pi \sin \theta.$$

Now $\varphi_0 - \varphi_1$ is within the range of $-2\pi$ to $2\pi$, this represents two cycles. When measuring the phase difference, it can only be distinguished within a range of $2\pi$. Hence, in this example, the same phase measurement (modulo $2\pi$) can give two different $\theta$ values. FIG. 8 illustrates an example of this phase ambiguity due to the fact that the wave can travel an extra integer number of wavelength for different values of $\theta$.

Note that while the previous analysis assumed that the rays to each receiver are parallel, this method can also apply if the rays are not parallel, e.g., the transmitter is not far enough from the receive antenna elements relative to the separation between the receive antenna elements. In this case, the difference between the two path between the transmitter and each receiver can be calculated using the geometry of the deployment and corresponding phase difference depends on the path difference ($\Delta D$), wherein $$\Delta \varphi = 2\pi \frac{\Delta D}{\lambda}.$$

Figure 9:
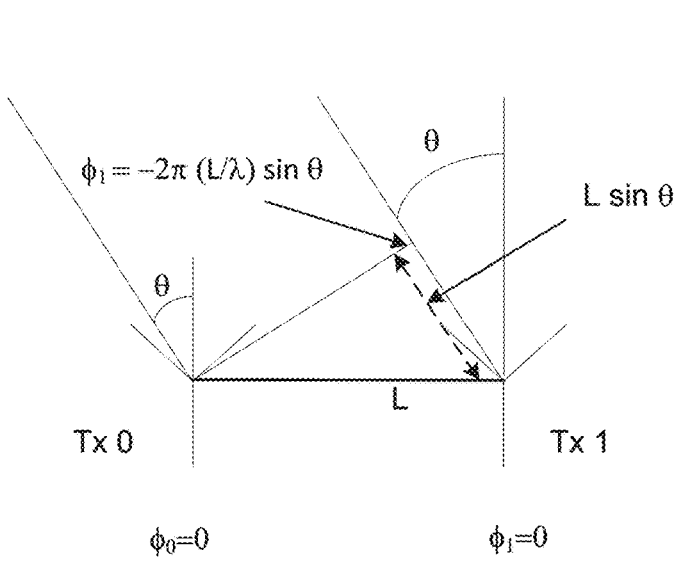
FIG. 9 illustrates an example of a phase difference between two rays according to embodiments of the present disclosure.

FIG. 9 illustrates an example of a phase difference between two rays 900 according to embodiments of the present disclosure. The embodiment of the phase difference between two rays 900 illustrated in FIG. 9 is for illustration only. FIG. 9 does not limit the scope of this disclosure to any particular implementation of the phase difference between two rays 900.

Conversely, when two rays are transmitted by two transmit antenna elements and that are, e.g., synchronized in phase relative to the start of the respective transmission periods, the rays are received by a receive antenna element. The phase difference between received ray from the respective transmit element is related to the transmission angle as illustrated in FIG. 9. Consider rays that travel parallel, as shown in FIG. 9 (the receiver is far enough from the transmitter antenna elements that two rays are parallel or almost parallel), the wave front is a plane perpendicular to the direction of the wave. To reach the same wave front, the ray from Tx1, travels an extra distance L sin $\theta$. Hence, there is a phase lag in the signal from Tx1 compared to Tx0 by $$\frac{2\pi}{\lambda} L \sin \theta.$$

If the signal $S_0$ from Tx0 at a receiver is $S_0 = A_0 \cos \varphi_0$, the signal from Tx1 at the receiver is $$S_1 = A_1 \cos \varphi_1 = A_1 \cos\left(\varphi_0 - \frac{2\pi}{\lambda} L \sin \theta\right).$$

Note that if the initial phase at the transmitters is not synchronized, e.g., $\phi_0$ at Tx0 and $\phi_1$ at Tx1, and if the signal $S_0$ from Tx0 at a receiver is $S_0 = A_0 \cos \varphi_0$, the signal from Tx1 at the receiver is $$S_1 = A_1 \cos \varphi_1 = A_1 \cos\left(\varphi_0 - \frac{2\pi}{\lambda} L \sin \theta + \phi_1 - \phi_0\right).$$

Note that while the previous analysis assumed that the rays from each transmitter are parallel, this method can also apply if the rays are not parallel, e.g., the receiver is not far enough from the transmitter antenna elements relative to the separation between the transmit antenna elements. In this case, the difference between the two path between the receiver and each transmitter can be calculated using the geometry of the deployment and corresponding phase difference depends on the path difference (ΔD), wherein $$\Delta\varphi = 2\pi\frac{\Delta D}{\lambda}.$$

Various embodiments of the present disclosure consider the use of the phase difference between two rays, where these rays can be:

From a single source arriving at two or more receive antenna elements,

From two or more transmit antenna elements arriving at a receive antenna element, From one transmit antenna at two or more different transmission times arriving at a receive antenna, wherein the transmit antenna is moving and the receive antenna is stationary, From one transmit antenna at two or more different transmission times arriving at a receive antenna, wherein the transmit antenna is stationary and the receive antenna is moving.

The phase difference between two rays is used to estimate the direction of travel of the rays (angle of arrival or angle of transmission).

Various embodiments of the present disclosure recognize that 3GPP Rel-16 is the first NR release to include sidelink through work item "5G V2X with NR sidelink" and RAT-based positioning through work item "NR Positioning Support". Rel-17 further enhanced accuracy and reduced the latency of NR-based positioning through work item "NR Positioning Enhancements". In Rel-17, a study was conducted in the RAN on "scenarios and requirements of in-coverage, partial coverage, and out-of-coverage positioning use cases" with accuracy requirements in the 10's of cm range, using the PC5 interface as well as the Uu interface for absolute and relative positioning. Carrier phase method is a promising technique for estimating the positioning of a UE by measuring the phase difference between at least two receive antennas or from two transmit antenna elements and determining the angel of arrival or the angle of transmission.

Accordingly, various embodiments of the present disclosure introduce signaling and methods for:

Using the carrier-phase method to estimate the angle of arrival or the angle of transmission.

Using the carrier-phase method for estimating the position of a UE.

Using the carrier-phase method for estimating the speed of a UE.

In one example, the UL positioning reference signal (e.g., Positioning Sounding Reference Signal—Pos-SRS) in the present disclosure is a reference signal designed for the carrier-phase method.

In one example, the UL positioning reference signal (e.g., Positioning Sounding Reference Signal—Pos-SRS) in this disclosure is a reference signal introduced in the Rel-16 and Rel-17 3GPP specifications for positioning.

A UE is configured to transmit a positioning reference signal in the uplink direction, e.g., the positioning reference signal is a positioning sounding reference signal (positioning SRS). The configuration of the uplink positioning reference signal can include:

Time domain resources, e.g., number of symbols and starting position (e.g., starting symbol) within a slot of UL positioning reference signal (e.g., positioning SRS).

Time domain behavior, whether transmission is aperiodic, semi-persistent or periodic transmission, including periodicity for semi-persistent and periodic transmissions.

Frequency domain resources, e.g., starting position in frequency domain (e.g., FD shift), and length in frequency domain (e.g., number of PRBs or C-SRS).

Transmission comb related information. Number of transmission combs and transmission comb offset.

Code domain information, e.g., sequence ID, and group or sequence hopping type (e.g., neither, groupHopping or sequenceHopping).

In one example, the transmission of the positioning reference signal from the UE is Omni-directional, e.g., a same transmission from a UE can be received by one or more antenna elements or one or more TRPs.

In one example, the transmission of positioning reference signal from the UE is on separate beams wherein a transmission on a beam is directed to one or more TRPs.

In one example, the transmissions on different beams can have the same configuration, using the aforementioned configuration parameters, In another example, the transmissions on different beams can have different configuration parameters, wherein one or more of the aforementioned configuration parameters is beam specific or TRP specific. For example, different UL positioning reference signals can be transmitted in different slots for different beams to different TRPs.

Figure 10:
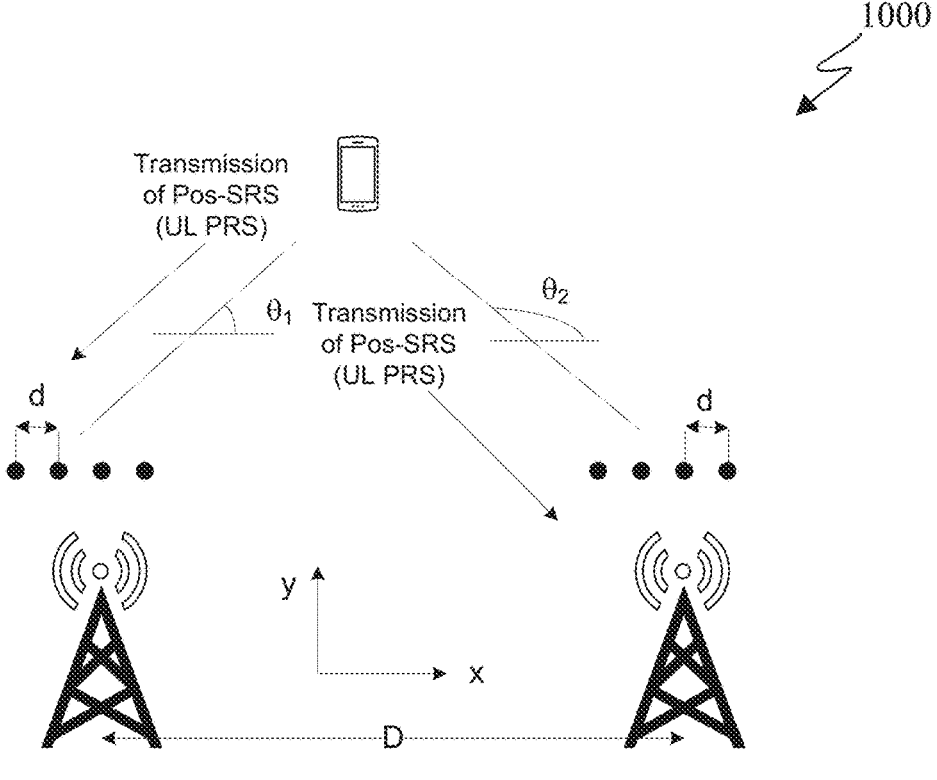
FIG. 10 illustrates an example of reception of the uplink (UL) positioning reference signal according to embodiments of the present disclosure

FIG. 10 illustrates an example of reception of the UL positioning reference signal 1000 according to embodiments of the present disclosure. The embodiment of the reception of the UL positioning reference signal 1000 illustrated in FIG. 10 is for illustration only. FIG. 10 does not limit the scope of this disclosure to any particular implementation of the reception of the UL positioning reference signal 1000.

As illustrated in FIG. 10, the UL positioning reference signal can be received by more than one TRP. In one example, the TRP can have multiple receive antenna elements as illustrated in FIG. 10. In one example, the number of receive antenna elements is N and the separation between two adjacent receive antenna elements is d, in one example d=λ/2. In one example, the antenna elements are linear as illustrated in FIG. 10 with equal separation between the antenna elements, in one example, the antenna elements are on the x-axis (e.g., the x-axis taken to be the line connecting the antenna elements). In one example, the antenna elements are linear but have non-equal separation. In one example the antenna elements non-linear, but co-planer in the x-y plane. In one example, the separation between two adjacent TRPs is D.

In one example, the TRP measures the phase difference between the signals received on two antenna elements. The two antenna elements can be adjacent antenna elements or non-adjacent antenna elements. If the two antenna elements are adjacent, the phase difference between the signal received on the two antenna elements as described earlier is:

$$\frac{2\pi}{\lambda}d\cos\theta.$$

Wherein, λ is the wavelength of the carrier frequency, d is the separation between two antenna elements as illustrated in FIG. 10, θ is the angle to the x-axis as illustrated in FIG. 10, the x-axis for example can be the line joining the antenna elements. In one example, the phase difference is calculated as the phase of antenna element to right minus the phase of the antenna element to the left, if the calculated phase difference if positive, i.e., the element to the right leads the element to the left in phase, the angle $\theta$ can be between 0 and $\pi/2$, the angle can also be between $-\pi/2$ and $\theta$, e.g., $\theta_1$ in FIG. 10, in one example the gNB determines which of these two ranges by its implementation. If the calculated phase difference is negative, i.e., the element to the right lags the element to the left in phase the angle $\theta$ can be between $\pi/2$ and it, the angle can also be between and $-\pi/2$, e.g., $\theta_2$ in FIG. 10, in one example the gNB determines which of these two ranges by its implementation.

In one example, if the number of receive antennas is more than 2 (N>2), a TRP can calculate N−1 phase difference between each two adjacent elements, e.g., $\Delta\phi_1$, $\Delta\phi_2$, . . . , $\Delta\phi_{N-1}$. In one example, a TRP can calculate an average phase difference $\Delta\phi$ as:

In one example, $$\Delta\phi = \frac{1}{N-1}\sum_{n=1}^{N-1}\Delta\phi_n$$

In one example, $$\exp(i2\pi\Delta\phi) = \frac{1}{N-1}\sum_{n=1}^{N-1}\exp(i2\pi\Delta\phi_n)$$

The angle $\Delta\phi$ can be used to calculate angle $\theta$ as aforementioned.

In another example, angle $\theta_n$ is calculated for each $\Delta\phi_n$ as aforementioned. The calculated $\theta_n$ values are then averaged to get $\theta$, i.e., $$\theta = \frac{1}{N-1}\sum_{n=1}^{N-1}\Delta\theta_n.$$

In one example, e.g., if a UE is stationary, $\Delta\phi(m)$ is calculate for time slot m in which the positioning reference signal is transmitted.

In one example, $\Delta\phi$ is calculated by averaging, $\Delta\phi(m)$, over the most recent M slots in which $\Delta\phi(m)$ is measured, wherein m is the index of the respective slots. Wherein, M can be specified in the system specifications and/or configured or updated by RRC signaling and/or MAC CE signaling and/or L1 control information.

In one example, $\exp(i2\pi\Delta\phi)$ is calculated by averaging $\exp(i2\pi\Delta\phi(m))$ over the most recent M slots in which $\Delta\phi(m)$ is measured, wherein m is the index of the respective slots. Wherein, M can be specified in the system specifications and/or configured or updated by RRC signaling and/or MAC CE signaling and/or L1 control information.

In one example, $\Delta\phi$ is calculated as exponential average, e.g., $\Delta\phi_{current}=(1-\alpha)\Delta\phi_{previous}+\alpha\Delta\phi(m)$ or $\Delta\phi_{current}=\alpha\Delta\phi_{previous}+(1-\alpha)\Delta\phi(m)$. Wherein, $\alpha$ can be specified in the system specifications and/or configured or updated by RRC signaling and/or MAC CE signaling and/or L1 control information.

In one example, $\Delta\phi$ is calculated as exponential average, e.g., $\exp(i2\pi\Delta\phi_{current})=(1-\alpha)\exp(i2\pi\Delta\phi_{previous})+\alpha\exp(i2\pi\Delta\phi(m))$ or $\exp(2\pi\Delta\phi_{current})=\alpha\exp(i2\pi\Delta\phi_{previous})+$ $(1-\alpha)\exp(j2\pi\Delta\phi(m))$. Wherein, $\alpha$ can be specified in the system specifications and/or configured or updated by RRC signaling and/or MAC CE signaling and/or L1 control information, In one example, e.g., if a UE is stationary, $\Delta\phi(m)$ is calculate for time slot m in which the positioning reference signal is transmitted and corresponding $\theta(m)$ is calculated as aforementioned.

In one example, $\theta$ is calculated by averaging, $\theta(m)$, over the most recent M slots in which $\theta(m)$ is calculated, wherein m is the index of the respective slots. Wherein, M can be specified in the system specifications and/or configured or updated by RRC signaling and/or MAC CE signaling and/or L1 control information.

In one example, $\theta$ is calculated as exponential average, e.g., $\theta_{current}=(1-\alpha)\theta_{previous}+\alpha\theta(m)$ or $\theta_{current}=\alpha\theta_{previous}+(1-\alpha)\theta(m)$. Wherein, a can be specified in the system specifications and/or configured or updated by RRC signaling and/or MAC CE signaling and/or L1 control information.

In one example, if $\theta_1$ is determined for TRP1 using one of the aforementioned examples, and $\theta_2$ is determined TRP2 using one of the aforementioned examples, a position of a UE, with respect to the TRPs, can be determined as follows:

$x_1$ and $y_1$ are the x and y positions of the UE relative to TRP1. $y_1=x_1\tan\theta_1$ $x_2$ and $y_2$ are the x and y positions of the UE relative to TRP2. $y_2=x_2\tan\theta_2$ In the example of FIG. 10, the two TRPs are on the X axis and separated by a distance D. Therefore, $y_1=y_2$ and $x_1-x_2=D$. Therefore, $x_1\tan\theta_1=(x_1-D)\tan\theta_2$. Hence, $$x_1 = \frac{D\tan\theta_2}{\tan\theta_2 - \tan\theta_1}.$$

The other distances can be readily calculated using the aforementioned equations.

Other configurations are possible if the TRPs are not along the x-axis, a person skilled in the art using trigonometrical equations can calculate the corresponding distances.

In one example, a UE is not stationary, i.e., a UE is moving. The UE transmits a first UL positioning reference signal in slot $m_1$, a UE transmits a second UL positioning reference signal in slot $m_2$. The time between the start of slot $m_1$ and the start of slot $m_2$ is T. The positioning vector in reference to TRP1 is calculate in slot $m_1$ as $x_1(m_1)\hat{a}_x+y_1(m_1)\hat{a}_y$. The positioning vector in reference to TRP1 is calculate in slot $m_2$ as $x_1(m_2)\hat{a}_x+y_1(m_2)\hat{a}_y$. Therefore, the velocity of the UE relative to TRP1 can be calculated as:

$$\frac{x_1(m_2) - x_1(m_1)}{T}\hat{a}_x + \frac{y_1(m_2) - y_1(m_1)}{T}\hat{a}_y$$

Alternatively, or additionally the velocity can be calculated relative to TRP2 as $$\frac{x_2(m_2) - x_2(m_1)}{T}\hat{a}_x + \frac{y_2(m_2) - y_2(m_1)}{T}\hat{a}_y.$$

If the TRPs are stationary, the calculated velocities relative to TRP1 or relative to TRP2 may be the same.

In one example, a TRP may report one or more of the following information to the LMF or to other TRPs or to the UE The measured phase difference between each two receive antenna elements.

The averaged phase difference using one of the aforementioned examples.

The phase difference (averaged or between each two antenna elements) for each slot in which an UL positioning reference signal is transmitted.

Time averaged phase difference over multiple slots as aforementioned.

The calculated angle θ, as aforementioned, using the measured phase difference between each two receive antenna elements.

The calculated angle θ, as aforementioned, using the averaged phase difference using one of the aforementioned examples.

The calculated angle θ using the phase difference (averaged or between each two antenna elements) for each slot in which an UL positioning reference signal is transmitted.

The time averaged calculated angle θ over multiple slots as aforementioned.

In one example, a TRP may report one or more of the following information to the LMF or to other TRPs or to the UE The position of the TRP (e.g., latitude, longitude and/or elevation).

The distance between antenna elements.

The structure of the antenna elements (e.g., 1-D (linear) or 2-D (planer), etc.).

The orientation of the antenna elements relative to the x-y axis (e.g., latitude-longitude axis).

The orientation of the axis used to report θ.

In one example, a TRP can be a device capable of receiving and/or transmitting positioning reference signals as well as other types of UL and DL traffic.

In one example, a TRP can be a device capable of only receiving and/or transmitting positioning reference signals.

A UE can include multiple transmit antennas or multiple antenna panels. A UE transmits a positioning reference signal in the uplink direction from each transmit antenna or from each antenna panel, wherein the transmitted positioning reference signals from different transmit antennas or from different antenna panels are orthogonal or quasi-orthogonal. The transmitted signals from the different antenna elements are synchronized in phase or have a fixed phase difference. The orthogonality can be in time domain, i.e., different transmit antennas or different antenna panels transmit in different time intervals (e.g., different symbols or different slots or different sub-frames, . . . ), and/or frequency domain, i.e., different transmit antennas or different antenna panels transmit in different frequency intervals (e.g., in different sub-carriers, or in different PRBs or using different comb shifts (comb off sets), . . . ), and/or code domain, i.e., different transmit antennas or different antenna panels transmit using sequences that are orthogonal or quasi-orthogonal to each other.

The configuration of the uplink positioning reference signal can include (some or all of these parameters can be different for different antennas or antenna panels):

Time domain resources, e.g., number of symbols and starting position (e.g., starting symbol) within a slot of UL positioning reference signal (e.g., positioning SRS).

Time domain behavior, whether transmission is aperiodic, semi-persistent or periodic transmission, including periodicity for semi-persistent and periodic transmissions.

Frequency domain resources, e.g., starting position in frequency domain (e.g., FD shift), and length in frequency domain (e.g., number of PRBs or C-SRS).

Transmission comb related information. Number of transmission combs and transmission comb offset.

Code domain information, e.g., sequence ID, and group or sequence hopping type (e.g., neither, groupHopping or sequenceHopping).

In one example, the transmission of the positioning reference signal from the UE is Omni-directional, e.g., a same transmission from a UE can be received by one or more TRPs.

In one example, the transmission of positioning reference signal from the UE is on separate beams wherein a transmission on a beam is directed to one or more TRPs or on separate panels.

In one example, the transmissions on different beams can have the same configuration, using the aforementioned configuration parameters, In another example, the transmissions on different beams can have different configuration parameters, wherein one or more of the aforementioned configuration parameters is beam specific or TRP specific. For example, different UL positioning reference signals can be transmitted in different slots for different beams to different TRPs.

Figure 11:
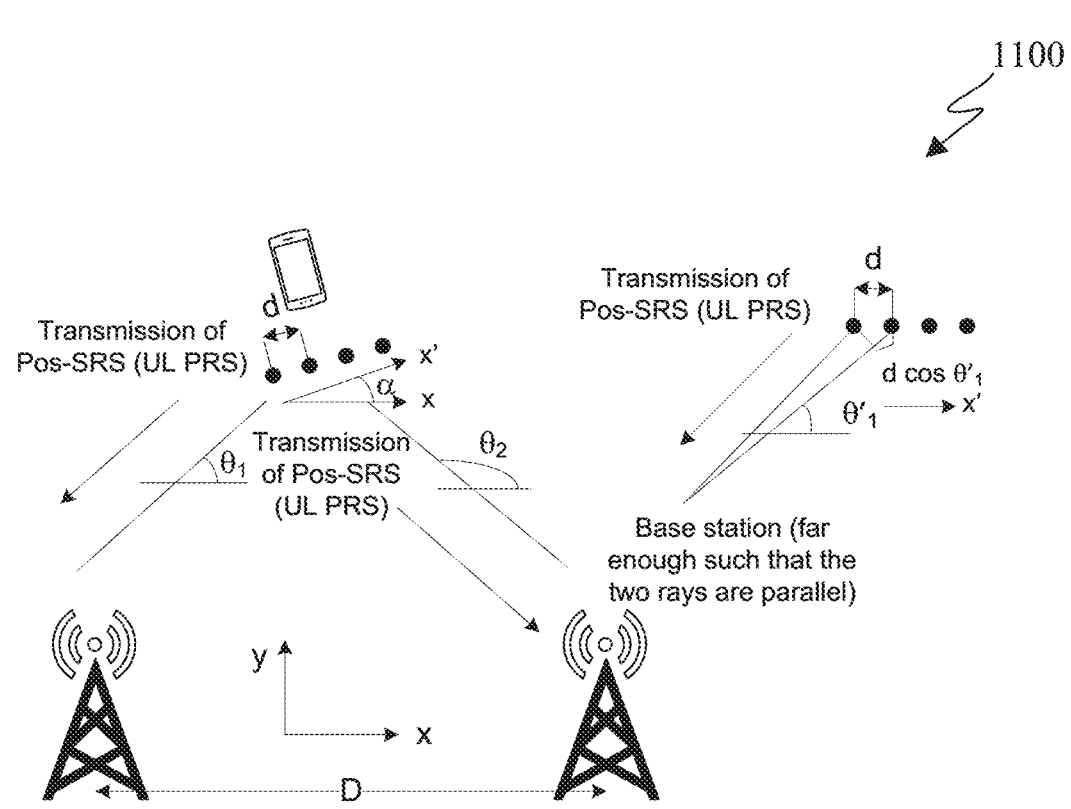
FIG. 11 illustrates an example of reception of the UL positioning reference signal according to embodiments of the present disclosure.

FIG. 11 illustrates an example of reception of the UL positioning reference signal 1100 according to embodiments of the present disclosure. The embodiment of the reception of the UL positioning reference signal 1100 illustrated in FIG. 11 is for illustration only. FIG. 11 does not limit the scope of this disclosure to any particular implementation of the reception of the UL positioning reference signal 1100.

As illustrated in FIG. 11, the UL positioning reference signal can be received by more than one TRP. In one example, the UE can have multiple transmit antenna elements or antenna panels as illustrated in FIG. 11. In one example, the number of transmit antenna elements is N and the separation between two adjacent transmit antenna elements is d, in one example d=λ/2. In one example, the antenna elements are linear as illustrated in FIG. 11 with equal separation between the antenna elements, in one example, the antenna elements are on the x'-axis (e.g., the x'-axis taken to be the line connecting the antenna elements). In one example, the antenna elements are linear but have non-equal separation. In one example the antenna elements non-linear, but co-planer in the x-y plane. In one example, the separation between two adjacent TRPs is D. In one example as illustrated in FIG. 11, we take the line connecting the antenna elements in the UE as the x'-axis. The line connecting the TRPs is the x-axis. In one example, the angle between the x'-axis and the x-axis is a as illustrated in FIG. 11. In one example, a can be 0, for example the UE can be a car UE travelling along a road and the orientation of the antenna array in the car UE is parallel to the road (direction of travel) and TRPs are installed along the road, the line connecting the TRPs is parallel to the road.

The signal is transmitted from each antenna element, and it arrives at the base station antenna, due to the different travel time from each transmit antenna element to the receive antennas of the base stations, there is phase difference between the two rays arriving at each TRP. Each TRP measures the phase difference of the received signal from the transmit antennas of the UE. The two antenna elements can be adjacent antenna elements or non-adjacent antenna elements. If the two antenna elements are adjacent, the phase difference between the signal received from the two transmit antenna elements can be expressed as: Wherein, $$\frac{2\pi}{\lambda} d\cos\theta'.$$

$\lambda$ is the wavelength of the carrier frequency, d is the separation between the two antenna elements as illustrated in FIG. 11, $\theta'$ is the angle to the x'-axis as illustrated in FIG. 11, the x'-axis for example can be the line joining the antenna elements in the UE. In one example, the phase difference is calculated as the phase from the antenna element to the left minus the phase from the antenna element to the right, if the calculated phase difference if positive, the angle $\theta'$ can be between 0 and $\pi/2$, the angle can also be between $-\pi/2$ and 0, e.g., $\theta_1$ in FIG. 11. If the calculated phase difference is negative, the angle $\theta'$ can be between $\pi/2$ and $\pi$, the angle can also be between $-\pi$ and $-\pi/2$, e.g., $\theta_2$ in FIG. 11.

In one example, if the number of transmit antennas is more than 2 (N>2), a TRP can calculate N−1 phase difference between each two adjacent elements, e.g., $\Delta\phi_1$, $\Delta\phi_2$, . . . , $\Delta\phi_{N-1}$. In one example, a TRP can calculate an average phase difference $\Delta\phi$ as:

In one example, $$\Delta\phi = \frac{1}{N-1}\sum_{n=1}^{N-1}\Delta\phi_n$$

In one example, $$\exp(i2\pi\Delta\phi) = \frac{1}{N-1}\Sigma_{n=1}^{N-1}\exp(i2\pi\Delta\phi_n)$$

The angle $\Delta\phi$ can be used to calculate angle $\theta'$ as aforementioned.

In another example, angle $\theta'_n$ is calculated for each $\Delta\phi_n$ as aforementioned. The calculated $\theta'_n$ values are then averaged to get $\theta'$, i.e., $$\theta' = \frac{1}{N-1}\Sigma_{n=1}^{N-1}\Delta\theta'_n$$

In one example, if $\theta'_1$ is determined for TRP1 using one of the aforementioned examples, and $\theta'_2$ is determined TRP2 using one of the aforementioned examples, a position of a UE, with respect to the TRPs, can be determined as follows:

If $\alpha=0$, i.e., the x-axis is parallel to the x'-axis. $\theta_1=\theta'_1$ and $\theta_2=\theta'_2$.

$x_1$ and $y_1$ are the x and y positions of the UE relative to TRP1. $y_1=x_1 \tan \theta_1$ $x_2$ and $y_2$ are the x and y positions of the UE relative to TRP2. $y_2=x_2 \tan \theta_2$ In the example of FIG. 11, the two TRPs are on the X axis and separated by a distance D. Therefore, $y_1=y_2$ and $x_1-x_2=D$. Therefore, $x_1 \tan \theta_1=(x_1-D) \tan \theta_2$. Hence, $$x_1 = \frac{D\tan\theta_2}{\tan\theta_2 - \tan\theta_1}.$$

The other distances can be readily calculated using the aforementioned equations.

In one example, if $\theta'_1$ is determined for TRP1 using one of the aforementioned examples, and $\theta'_2$ is determined TRP2 using one of the aforementioned examples, and $\theta'_3$ is determined TRP3 using one of the aforementioned examples, a position of a UE, with respect to the TRPs, can be determined as follows:

The x-axis and the x'-axis are at an angle $\alpha$ to each other. $\theta_1=\theta'_1-\alpha$ and $\theta_2=\theta'_2-\alpha$ and $\theta_3=\theta'_3-\alpha$.

$x_1$ and $y_1$ are the x and y positions of the UE relative to TRP1. $y_1=x_1 \tan \theta_1$ $x_2$ and $y_2$ are the x and y positions of the UE relative to TRP2. $y_2=x_2 \tan \theta_2$ $x_3$ and $y_3$ are the x and y positions of the UE relative to TRP3. $y_3=x_3 \tan \theta_3$ In this example, the three TRPs are on the X axis and separated by a distance D. Therefore, $y_1=y_2=y_3$ and $x_1-x_2=x_2-x_3=D$. Therefore, $x_1 \tan \theta_1=(x_1-D) \tan \theta_2$. Therefore, $\cot(\theta'_1-\alpha)-\cot(\theta'_2-\alpha)=\cot(\theta'_2-\alpha)-\cot(\theta'_3-\alpha)$. Using, the last equation we can calculate $\alpha$. Then as previously described, $$x_1 = \frac{D\tan\theta_2}{\tan\theta_2 - \tan\theta_1}.$$

The other distances can be readily calculated using the aforementioned equations.

In this configuration, the three TRPs are assumed to be co-linear and on one side of the road, other examples can be considered where the TRPs are not co-linear (e.g., in different sides of the road).

In one example, a TRP may report one or more of the following information to the LMF or to other TRPs or to the UE The measured phase difference from two transmit antenna elements of the UE.

The averaged phase difference using one of the aforementioned examples

The calculated angle $\theta'$, as aforementioned, using the measured phase difference from two transmit antenna elements of the UE.

The calculated angle $\theta'$, as aforementioned, using the averaged phase difference using one of the aforementioned examples.

The averaged angle $\theta'$, as aforementioned.

In one example, a TRP may report one or more of the following information to the LMF or to other TRPs or to the UE The position of the TRP (e.g., latitude, longitude and/or elevation).

In one example, a UE may report one or more of the following information to the LMF or the TRPs.

The distance between antenna elements.

The structure of the antenna elements (e.g., 1-D (linear) or 2-D (planer), etc.).

The orientation of the antenna elements relative to the x-y axis (e.g., latitude-longitude axis).

The orientation of the axis used to report $\theta$.

The initial phase of each transmission from an antenna element or the phase difference between antenna elements.

In one example, a TRP can be a device capable of receiving and/or transmitting positioning reference signals as well as other types of UL and DL traffic.

In one example, a TRP can be a device capable of only receiving and/or transmitting positioning reference signals.

A UE is moving at a velocity v and is transmitting a positioning reference signal in the uplink direction, e.g., the UE is transmitting a positioning sounding reference signal to multiple TRPs. Due to the motion of the UE, the transmissions in different slots appear as if they are from a virtual transmit antenna array with a separation between the virtual antenna elements of d=vT, where T is the time from start of transmission of uplink positioning reference signal to the start of a next transmission of uplink positioning reference signal. For example, if the number of slots between consecutive transmissions positioning reference signal is N slots, $T=NT_s$, where $T_s$ is the slot duration. For example, consider a UE moving at speed of 108 km/h (about 67.5 mph), or 30 m/s. If the subcarrier spacing is 30 kHz, the slot duration is $T_s$=0.5 ms, if the number of slots between consecutive positioning reference signal transmissions is 4 slots, d=30·(4·0.5)=60 mm, this represents $\lambda$/2 for a wave with frequency 2.5 GHz. The number of slots between consecutive transmissions of positioning reference signal used for phase difference estimation can be adjusted based on the speed of the UE. In one example, N (number of slots or number of symbols between consecutive transmissions of UL positioning reference signal) or T (time between consecutive transmissions of UL positioning reference signal) can be specified in the system specifications and/or configured or updated by RRC signaling and/or MAC CE signaling and/or L1 control signaling. The transmitted signals in different slots can be synchronized in phase or have a fixed phase difference.

A UE transmits a positioning reference signal (e.g., sounding reference signal (SRS) for position) in the uplink direction at different times (e.g., in different slots) to create a virtual transmit antenna array.

The configuration of the uplink positioning reference signal can include:

Time domain resources, e.g., number of symbols and starting position (e.g., starting symbol) within a slot of UL positioning reference signal (e.g., positioning SRS).

Time domain behavior, whether transmission is aperiodic, semi-persistent or periodic transmission, including periodicity for semi-persistent and periodic transmissions.

Frequency domain resources, e.g., starting position in frequency domain (e.g., FD shift), and length in frequency domain (e.g., number of PRBs or C-SRS).

Transmission comb related information. Number of transmission combs and transmission comb offset.

Code domain information, e.g., sequence ID, and group or sequence hopping type (e.g., neither, groupHopping or sequenceHopping).

In one example, the transmission of the positioning reference signal from the UE is Omni-directional, e.g., a same transmission from a UE can be received by one or more antenna elements.

In one example, the transmission of positioning reference signal from the UE is on separate beams wherein a transmission on a beam is directed to one or more TRPs.

In one example, the transmissions on different beams can have the same configuration, using the aforementioned configuration parameters, In another example, the transmissions on different beams can have different configuration parameters, wherein one or more of the aforementioned configuration parameters is beam specific or TRP specific. For example, different UL positioning reference signals can be transmitted in different slots for different beams to different TRPs.

Figure 12:
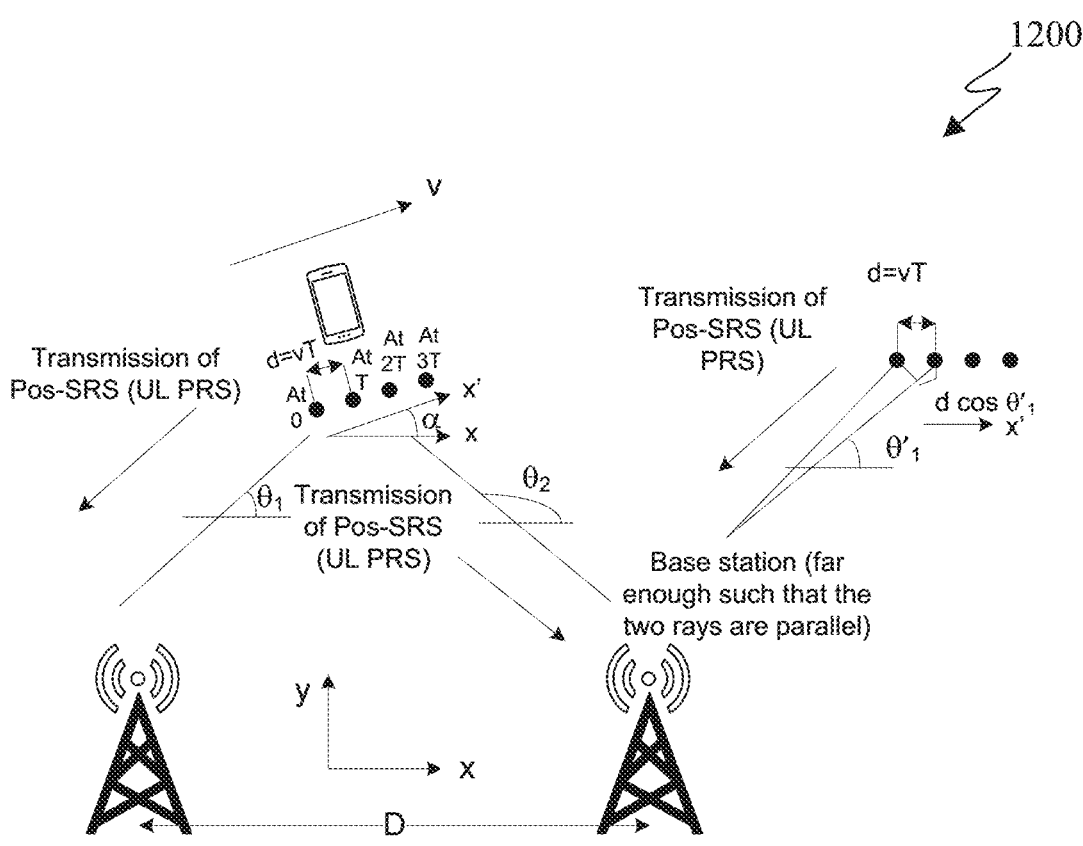
FIG. 12 illustrates an example of reception of the UL positioning reference signal according to embodiments of the present disclosure.

FIG. 12 illustrates an example of reception of the UL positioning reference signal 1200 according to embodiments of the present disclosure. The embodiment of the reception of the UL positioning reference signal 1200 illustrated in FIG. 12 is for illustration only. FIG. 12 does not limit the scope of this disclosure to any particular implementation of the reception of the UL positioning reference signal 1200.

As illustrated in FIG. 12, the UL positioning reference signal can be received by more than one TRP. In one example, UE can transmit the positioning reference signal at different slots as illustrated in FIG. 12. In one example as illustrated in FIG. 12, we take the direction of motion of the UE (the direction of virtual transmit antenna array) as the x'-axis. The line connecting the TRPs is the x-axis. In one example, the angle between the x'-axis and the x-axis is $\alpha$ as illustrated in FIG. 12. In one example, $\alpha$ can be 0, for example the UE can be a car UE travelling along a road the direction of travel of the car UE (or the direction of the virtual transmit antenna array) is parallel to the road (direction of travel) and TRPs are installed along the road, the line connecting the TRPs is parallel to the road.

The signal is transmitted at different times, and it arrives at the base station antenna, due to the different travel time from the UE's transmit antenna in different slots to the receive antennas of the base stations, there is phase difference between the two rays arriving at each TRP in two different slots or symbols. This phase difference can be expressed as:

$$\frac{2\pi}{\lambda} vT\cos\theta'.$$

Wherein, $\Delta$ is the wavelength of the carrier frequency, vT is the separation between the antenna elements at different transmit times as illustrated in FIG. 12, $\theta$' is the angle to the x'-axis as illustrated in FIG. 12, the x'-axis for example can be the line joining the antenna elements. In one example, the phase difference is calculated as the phase from the first transmission minus the phase from next transmission, if the calculated phase difference if positive, the angle $\theta$' can be between 0 and $\pi$/2, the angle can also be between $-\pi$/2 and 0, e.g., $\theta_1$ in FIG. 12. If the calculated phase difference is negative, the angle $\theta$' can be between $\pi$/2 and $\pi$, the angle can also be between $-\pi$ and $-\pi$/2, e.g., $\theta_2$ in FIG. 12.

In one example, if the number of instances (slots) of positioning reference signal transmission used for phase and angle estimation is more than 2 (N>2), a TRP can calculate N−1 phase difference between each two adjacent transmissions, e.g., $\Delta\phi_1, \Delta\phi_2, \ldots, \Delta\phi_{N-1}$. Wherein, N can be specified in the system specifications and/or configured or updated by RRC signaling and/or MAC CE signaling and/or L1 control information. In one example, a TRP can calculate an average phase difference $\Delta\phi$ as:

In one example, $$\Delta\phi = \frac{1}{N-1}\Sigma_{n=1}^{N-1}\Delta\phi_n$$

In one example, $$\exp(i2\pi\Delta\phi) = \frac{1}{N-1}\Sigma_{n=1}^{N-1}\exp(i2\pi\Delta\phi_n)$$

The angle $\Delta\phi$ can be used to calculate angle $\theta'$ as aforementioned.

In another example, angle $\theta'_n$ is calculated for each $\Delta\phi_n$ as aforementioned. The calculated $\theta'_n$ values are then averaged to get $\theta'$, i.e., $$\theta' = \frac{1}{N-1}\sum_{n=1}^{N-1}\Delta\theta'_n$$

In one example, the speed of the UE, v, is known and the angle $\theta'$ is calculated as aforementioned using the speed.

In one example, the speed of the UE, v, is unknown, the speed is estimated along with the other parameters. One of more of the following can be unknown, The speed of the UE The direction of travel of the UE The position of the UE relative to one of the TRPs. This is represented by two unknowns x and y.

Depending on the number of unknowns, a number of TRP phase measurements can be made. For example, with two knowns, e.g., x and y, phase difference measurements from TRP1 and TRP2 can be used to estimate the unknown positions x and y. In another example, with three unknowns, e.g., x and y and either speed of the UE or the direction of the travel, phase difference measurements from TRP1, TRP2 and TRP3 can be used to estimate the unknown positions x and y and either speed of the UE or the direction of the travel. In another example, with four unknowns, e.g., x, y, speed of the UE and the direction of the travel, phase difference measurements from TRP1, TRP2, TRP3 and TRP4 can be used to estimate the unknown positions x, y, speed of the UE and the direction of the travel.

In one example, if the speed of the UE is unknown, and $\alpha=0$, the direction of travel is parallel to the direction of the line connecting the TRPs.

- $\Delta\varphi_1 = \frac{2\pi}{\lambda}vT\cos\theta'_1$, therefore, $$\cot\theta_1 = \cot\theta_1 = \frac{2\pi vT}{\sqrt{-(2\pi vT)^2 + (\lambda\Delta\varphi_1)^2}}$$

- $\Delta\varphi_2 = \frac{2\pi}{\lambda}vT\cos\theta'_2$, therefore, $$\cot\theta_2 = \cot\theta_2 = \frac{2\pi vT}{\sqrt{-(2\pi vT)^2 + (\lambda\Delta\varphi_2)^2}}$$

- $\Delta\varphi_3 = \frac{2\pi}{\lambda}vT\cos\theta'_3$, therefore, $$\cot\theta_3 = \cot\theta_3 = \frac{2\pi vT}{\sqrt{-(2\pi vT)^2 + (\lambda\Delta\varphi_3)^2}}$$

Using the analysis presented herein, it can be found that $$x_1 = \frac{D\tan\theta_2}{\tan\theta_2 - \tan\theta_1} = \frac{2D\tan\theta_3}{\tan\theta_3 - \tan\theta_1}.$$

By subsisting for $\tan\theta_1$, $\tan\theta_2$ and $\tan\theta_3$ from the above equations, the value of v and $x_1$ can be found. The other distances can be readily calculated using the aforementioned equations.

In one example, if $\theta'_1$ is determined for TRP1 using one of the aforementioned examples, and $\theta'_2$ is determined for TRP2 using one of the aforementioned examples, a position of a UE can be determined as follows:

If $\alpha=0$, i.e., the x-axis is parallel to the x'-axis. $\theta_1=\theta'_1$ and $\theta_2=\theta'_2$.

$x_1$ and $y_1$ are the x and y positions of the UE relative to TRP1. $y_1=x_1\tan\theta_1$ $x_2$ and $y_2$ are the x and y positions of the UE relative to TRP2. $y_2=x_2\tan\theta_2$ In the example of FIG. 12, the two TRPs are on the X axis and separated by a distance D. Therefore, $y_1=y_2$ and $x_1-x_2=D$. Therefore, $x_1\tan\theta_1=(x_1-D)\tan\theta_2$. Hence, $$x_1 = \frac{D\tan\theta_2}{\tan\theta_2 - \tan\theta_1}.$$

The other distances can be readly calculated using the aforementioned equations.

FIG. 13 illustrates an example of a virtual transmit antenna array as result of the UE's mobility 1300 according to embodiments of the present disclosure. The embodiment of the virtual transmit antenna array as result of the UE's mobility 1300 illustrated in FIG. 13 is for illustration only. FIG. 13 does not limit the scope of this disclosure to any particular implementation of the virtual transmit antenna array as result of the UE's mobility 1300.

As illustrated in FIG. 13, if the UL positioning reference signal (e.g., positioning sounding reference signal (Pos-SRS)) occurs every T seconds, and the UE is moving at a speed v, the distance between two carrier phase measurements is d=v T. The presence of the UE at different positions over time creates a virtual transmit antenna array that can be leveraged for phase difference measurements and accordingly calculating the direction of travel of the radio wave.

In one example, a TRP may report one or more of the following information to the LMF or to other TRPs or to the UE The measured phase difference from two consecutive transmission instances separated by time T.

The averaged phase difference using one of the aforementioned examples

The calculated angle $\theta'$, as aforementioned, using the measured phase difference from two consecutive transmissions of positioning reference signal.

The calculated angle $\theta'$, as aforementioned, using the averaged phase difference using one of the aforementioned examples.

The averaged angle $\theta'$, as aforementioned.

In one example, a TRP may report one or more of the following information to the LMF or to other TRPs or to the UE The position of the TRP (e.g., latitude, longitude and/or elevation).

In one example, a UE may report one or more of the following information to the LMF or the TRPs Speed of travel.

The direction of travel.

The initial phase of each transmission or the phase difference between transmissions.

In one example, a TRP can be a device capable of receiving and/or transmitting positioning reference signals as well as other types of UL and DL traffic.

In one example, a TRP can be a device capable of only receiving and/or transmitting positioning reference signals.

In one example, the DL positioning reference signal (e.g., DL PRS) in the present disclosure is a reference signal designed for the carrier-phase method.

In one example, the DL positioning reference signal (e.g., DL PRS) in this disclosure is a reference signal introduced in the Rel-16 and Rel-17 3GPP specifications for positioning.

A UE is configured to receive a positioning reference signal in the downlink direction, e.g., the positioning reference signal is a DL positioning reference signal (PRS). The UE can be configured to receive the DL PRS from multiple TRPs.

Each TRP can include multiple transmit antennas or antenna panels. The TRP transmits a positioning reference signal in the downlink direction from each transmit antenna or from each antenna panel, wherein the transmitted positioning reference signals from different transmit antennas or from different antenna panels are orthogonal or quasi-orthogonal. The transmitted signals from the different antenna elements are synchronized in phase or have a fixed phase difference. The orthogonality can be in time domain, i.e., different transmit antennas or different antenna panels transmit in different time intervals (e.g., different symbols or different slots or different subframes, . . . ), and/or frequency domain, i.e., different transmit antennas or different antenna panels transmit in different frequency intervals (e.g., in different sub-carriers, or in different PRBs or using different comb shifts (comb offsets), . . . ), and/or code domain, i.e., different transmit antennas or different antenna panels transmit using sequences that are orthogonal or quasi-orthogonal to each other.

The transmitted DL PRS from different TRPs is orthogonal or quasi-orthogonal. The orthogonality can be in time domain, i.e., different TRPs transmit in different time intervals (e.g., different symbols or different slots or different subframes, . . . ), and/or frequency domain, i.e., different TRPs transmit in different frequency intervals (e.g., in different sub-carriers, or in different PRBs or using different comb shifts (comb offsets), . . . ), and/or code domain, i.e., different TRPs transmit using sequences that are orthogonal or quasi-orthogonal to each other.

The configuration of the downlink PRS for each TRP can include (some or all of these parameters can be different for different antennas or antenna panels):

Time domain resources, e.g., number of symbols and starting position (e.g., starting symbol) within a slot of DL PRS.

Time domain behavior, whether transmission is aperiodic, semi-persistent or periodic transmission, including periodicity for semi-persistent and periodic transmissions.

Frequency domain resources, e.g., starting position in frequency domain (e.g., FD shift), and length in frequency domain (e.g., number of PRBs or C-SRS).

Transmission comb related information. Number of transmission combs and transmission comb offset.

Code domain information, e.g., sequence ID, and group or sequence hopping type (e.g., neither, groupHopping or sequenceHopping).

Some of the aforementioned parameters can be common across the multiple TRPs, e.g., configured with a common configuration, and some can be distinct, e.g., specific for each TRP.

In one example, the reception of the DL PRS at the UE is Omni-directional, e.g., a same spatial receive filter can receive transmissions from multiple TRPs.

In one example, the reception of the DL PRS at the UE from different TRPs is on separate beams wherein a reception on a beam is from one or more TRPs.

FIG. 14 illustrates an example of reception of the DL positioning reference signal 1400 according to embodiments of the present disclosure. The embodiment of the reception of the DL positioning reference signal 1400 illustrated in FIG. 14 is for illustration only. FIG. 14 does not limit the scope of this disclosure to any particular implementation of the reception of the DL positioning reference signal 1400.

As illustrated in FIG. 14, the DL PRS can be transmitted by more than one TRP. In one example, the TRP can have multiple transmit antenna elements as illustrated in FIG. 14. In one example, the number of transmit antenna elements is N and the separation between two adjacent receive antenna elements is d, in one example $d=\lambda/2$. In one example, the antenna elements are linear as illustrated in FIG. 14 with equal separation between the antenna elements, in one example, the antenna elements are on the x-axis (e.g., the x-axis can be taken to be the line connecting the antenna elements). In one example, the antenna elements are linear but have non-equal separation. In one example the antenna elements non-linear, but co-planer in the x-y plane. In one example, the separation between two adjacent TRPs is D.

The signal is transmitted from each antenna element of a TRP, and it arrives at the UE antenna, due to the different travel time from each transmit antenna element to the receive antennas of the UE, there is phase difference between the two rays arriving at the UE. The UE measures the phase difference of the received signal from the transmit antennas of each TRP. The two antenna elements can be adjacent antenna elements or non-adjacent antenna elements. If the two antenna elements are adjacent, the phase difference between the signal received from the two antenna elements can be expressed as:

$$\frac{2\pi}{\lambda}d\cos\theta.$$

Wherein, $\lambda$ is the wavelength of the carrier frequency, d is the separation between two the antenna elements as illustrated in FIG. 14, $\theta$ is the angle to the x-axis as illustrated in FIG. 14, the x-axis for example can be the line joining the antenna elements. In one example, the phase difference is calculated as the phase from the antenna element to the right minus the phase from the antenna element to the left, if the calculated phase difference if positive, the angle $\theta$ can be between 0 and $\pi/2$, the angle can also be between $-\pi/2$ and 0, e.g., $\theta_1$ in FIG. 14, in one example the gNB can assist the UE in determining which of these two ranges to use. If the calculated phase difference is negative, the angle $\theta$ can be between $\pi/2$ and $\pi$, the angle can also be between $-\pi$ and $-\pi/2$, e.g., $\theta_2$ in FIG. 14, in one example the gNB can assist the UE in determining which of these two ranges to use.

In one example, if the number transmit antennas is more than 2 (N>2), a UE can calculate N−1 phase difference between each two adjacent elements, e.g., $\Delta\phi_1$, $\Delta\phi_2$, . . . , $\Delta\phi_{N-1}$. In one example, a UE can calculate an average phase difference $\Delta\phi$ as:

In one example, $$\Delta\phi = \frac{1}{N-1}\Sigma_{n=1}^{N-1}\Delta\phi_n.$$

In one example, $$\exp(i2\pi\Delta\phi) = \frac{1}{N-1}\Sigma_{n=1}^{N-1}\exp(i2\pi\Delta\phi_n).$$

The angle $\Delta\phi$ can be used to calculate angle $\theta$ as aforementioned.

In another example, angle $\theta_n$ is calculated for each $\Delta\phi_n$ as aforementioned. The calculated $\theta_n$ values are then averaged to get $\theta$, i.e., $$\theta = \frac{1}{N-1}\Sigma_{n=1}^{N-1}\Delta\theta_n$$

In one example, e.g., if a UE is stationary, $\Delta\phi(m)$ is calculate for time slot m in which the DL PRS is transmitted.

In one example, $\Delta\phi$ is calculated by averaging, $\Delta\phi(m)$, over the most recent M slots in which $\Delta\phi(m)$ is measured, wherein m is the index of the respective slots. Wherein, M can be specified in the system specifications and/or configured or updated by RRC signaling and/or MAC CE signaling and/or L1 control information.

In one example, $\exp(i2\pi\Delta\phi)$ is calculated by averaging $\exp(i2\pi\Delta\phi(m))$ over the most recent M slots in which $\Delta\phi(i)$ is measured, wherein m is the index of the respective slots. Wherein, M can be specified in the system specifications and/or configured or updated by RRC signaling and/or MAC CE signaling and/or L1 control information.

In one example, $\Delta\phi$ is calculated as exponential average, e.g., $\Delta\phi_{current}=(1-\alpha)\Delta\phi_{previous}+\alpha\Delta\phi(m)$ or $\Delta\phi_{current}=\alpha\Delta\phi_{previous}+(1-\alpha)\Delta\phi(m)$ Wherein, $\alpha$ can be specified in the system specifications and/or configured or updated by RRC signaling and/or MAC CE signaling and/or L1 control information.

In one example, $\Delta\phi$ is calculated as exponential average, e.g., $\exp(i2\pi\Delta\phi_{current})=(1-\alpha)\exp(i2\pi\Delta\phi_{previous})+\alpha\exp(i2\pi\Delta\phi(m))$ or $\exp(i2\pi\Delta\phi_{current})=\alpha\exp(i2\pi\Delta\phi_{previous})+(1-\alpha)\exp(j2\pi\Delta\phi(m))$. Wherein, $\alpha$ can be specified in the system specifications and/or configured or updated by RRC signaling and/or MAC CE signaling and/or L1 control information.

In one example, e.g., if a UE is stationary, $\Delta\phi(m)$ is calculate for time slot m in which the positioning reference signal is transmitted and corresponding $\theta(m)$ is calculated as aforementioned.

In one example, $\theta$ is calculated by averaging, $\theta(m)$, over the most recent M slots in which $\theta(m)$ is calculated, wherein m is the index of the respective slots. Wherein, M can be specified in the system specifications and/or configured or updated by RRC signaling and/or MAC CE signaling and/or L1 control information.

In one example, $\theta$ is calculated as exponential average, e.g., $\theta_{current}=(1-\alpha)\theta_{previous}+\alpha\theta(m)$ or $\theta_{current}=\alpha\theta_{previous}+(1-\alpha)\theta(m)$. Wherein, $\alpha$ can be specified in the system specifications and/or configured or updated by RRC signaling and/or MAC CE signaling and/or L1 control information.

In one example, if $\theta_1$ is determined by the UE for TRP1 using one of the aforementioned examples, and $\theta_2$ is determined by the UE for TRP2 using one of the aforementioned examples, a position of a UE, with respect to the TRPs, can be determined as follows:

$x_1$ and $y_1$ are the x and y positions of the UE relative to TRP1. $y_1=x_1 \tan\theta_1$.

$x_2$ and $y_2$ are the x and y positions of the UE relative to TRP2. $y_2=x_2 \tan\theta_2$.

In the example of FIG. 7, the two TRPs are on the X axis and separated by a distance D. Therefore, $y_1=y_2$ and $x_1-x_2=D$. Therefore, $x_1 \tan\theta_1=(x_1-D)\tan\theta_2$. Hence, $$x_1 = \frac{D\tan\theta_2}{\tan\theta_2 - \tan\theta_1}.$$

The other distances can be readly calculated using the aforementioned equations.

Other configurations are possible if the TRPs are not along the x-axis, a person skilled in the art using trigonometrical equations can calculate the corresponding distances.

In one example, a UE is not stationary, i.e., a UE is moving. The UE receives a first DL PRS from one or more TRPs in slot $m_1$, a UE receives a second DL PRS from one or more TRPs in slot $m_2$. The time between the start of slot $m_1$ and slot $m_2$ is T. The positioning vector in reference to TRP1 is calculate in slot $m_1$ as $x_1(m_1)\hat{a}_x+y_1(m_1)\hat{a}_y$. The positioning vector in reference to TRP1 is calculate in slot $m_2$ as $x_1(m_2)\hat{a}_x+y_1(m_2)\hat{a}_y$. Therefore, the velocity of the UE can be calculated as:

$$\frac{x_1(m_2) - x_1(m_1)}{T}\hat{a}_x + \frac{y_1(m_2) - y_1(m_1)}{T}\hat{a}_y$$

Alternatively, or additionally the velocity can be calculated relative to TRP2 as $$\frac{x_2(m_2) - x_2(m_1)}{T}\hat{a}_x + \frac{y_2(m_2) - y_2(m_1)}{T}\hat{a}_y$$

If the TRPs are stationary, the calculated velocities relative to TRP1 or relative to TRP2 may be the same.

In one example, a UE may report one or more of the following information to the LMF or to one or more TRPs:

The measured phase difference between signal received from each two transmit antenna elements per TRP.

The averaged phase difference using one of the aforementioned examples per TRP.

The phase difference (averaged or between each two antenna elements) for each slot in which an DL PRS is received per TRP.

Time averaged phase difference over multiple slots as aforementioned per TRP.

The calculated angle θ, as aforementioned, using the measured phase difference between signal received for each two transmit antenna elements per TRP.

The calculated angle θ, as aforementioned, using the averaged phase difference using one of the aforementioned examples per TRP.

The calculated angle θ using the phase difference (averaged or between each two antenna elements) for each slot in which a DL PRS is transmitted per TRP.

The time averaged calculated angle θ over multiple slots as aforementioned per TRP.

The orientation of the axis used to report θ.

In one example, a TRP may report one or more of the following information to the LMF or to other TRPs or to the UE The position of the TRP (e.g., latitude, longitude and/or elevation).

The distance between antenna elements.

The structure of the antenna elements (e.g., 1-D (linear) or 2-D (planer), etc.).

The orientation of the antenna elements relative to the x-y axis (e.g., latitude-longitude axis).

The initial phase of each transmission from an antenna element or the phase difference between antenna elements.

In one example, a TRP can be a device capable of receiving and/or transmitting positioning reference signals as well as other types of UL and DL traffic.

In one example, a TRP can be a device capable of only receiving and/or transmitting positioning reference signals.

A UE can include multiple receive antennas or multiple antenna panels. A UE receives a positioning reference signal (PRS) in the downlink direction on each receive antenna or on each antenna panel from one or multiple TRPs. The UE can be configured to receive the DL PRS from multiple TRPs. Wherein the transmitted DL PRS from different TRPs are orthogonal or quasi-orthogonal. The orthogonality can be in time domain, i.e., different TRPs transmit in different time intervals (e.g., different symbols or different slots or different subframes, . . . ), and/or frequency domain, i.e., different TRPs transmit in different frequency intervals (e.g., in different sub-carriers, or in different PRBs or using different comb shifts (comb offsets), . . . ), and/or code domain, i.e., different TRPs transmit using sequences that are orthogonal or quasi-orthogonal to each other.

The configuration of the DL PRS for each TRP can include (some or all of these parameters can be different for different antennas or antenna panels):

Time domain resources, e.g., number of symbols and starting position (e.g., starting symbol) within a slot of DL PRS.

Time domain behavior, whether transmission is aperiodic, semi-persistent or periodic transmission, including periodicity for semi-persistent and periodic transmissions.

Frequency domain resources, e.g., starting position in frequency domain (e.g., FD shift), and length in frequency domain (e.g., number of PRBs or C-SRS).

Transmission comb related information. Number of transmission combs and transmission comb offset.

Code domain information, e.g., sequence ID, and group or sequence hopping type (e.g., neither, groupHopping or sequenceHopping).

Some of the aforementioned parameters can be common across the multiple TRPs, e.g., configured with a common configuration, and some can be distinct, e.g., specific for each TRP.

In one example, the reception of the DL PRS at the UE is Omni-directional, e.g., a same spatial receive filter can receive transmissions from multiple TRPs.

In one example, the reception of the DL PRS at the UE from different TRPs is on separate beams wherein a reception on a beam is from to one or more TRPs.

FIG. 15 illustrates an example of reception of the DL positioning reference signal according to embodiments of the present disclosure. The embodiment of the reception of the DL positioning reference signal 1500 illustrated in FIG. 15 is for illustration only. FIG. 15 does not limit the scope of this disclosure to any particular implementation of the reception of the DL positioning reference signal 1500.

As illustrated in FIG. 15, the DL PRS can be transmitted by more than one TRP. In one example, UE can have multiple receive antenna elements or antenna panels as illustrated in FIG. 15. In one example, the number of receive antenna elements is N and the separation between two adjacent receive antenna elements is d, in one example d=λ/2. In one example, the antenna elements are linear as illustrated in FIG. 15 with equal separation between the antenna elements, in one example, the antenna elements are on the x'-axis (e.g., the x'-axis taken to be the line connecting the antenna elements). In one example, the antenna elements are linear but have non-equal separation. In one example the antenna elements non-linear, but co-planer in the x-y plane. In one example, the separation between two adjacent TRPs is D. In one example as illustrated in FIG. 15, we take the line connecting the antenna elements in the UE as the x'-axis. The line connecting the TRPs is the x-axis. In one example, the angle between the x'-axis and the x-axis is α as illustrated in FIG. 15. In one example, α can be 0, for example the UE can be a car UE travelling along a road and the orientation of the antenna array in the car UE is parallel to the road (direction of travel) and TRPs are installed along the road, the line connecting the TRPs is parallel to the road.

The signal is transmitted from each TRP, and it arrives at each UE antenna, due to the different travel time from the transmit antenna element of each TRP to each receive antenna of the UE, there is phase difference between the two rays arriving at two receive antennas. The two receive antenna elements can be adjacent antenna elements or non-adjacent antenna elements. If the two antenna elements are adjacent, the phase difference can be expressed as:

$$\frac{2\pi}{\lambda} d \cos \theta'.$$

Wherein, λ is the wavelength of the carrier frequency, d is the separation between two antenna elements as illustrated in FIG. 15, θ' is the angle to the x'-axis as illustrated in FIG. 15, the x'-axis for example can be the line joining the antenna elements. In one example, the phase difference is calculated as the phase of antenna element to the left minus the phase of the antenna element to the right, if the calculated phase difference if positive, i.e., the element to the right leads the element to the left in phase, the angle θ' can be between 0 and π/2, the angle can also be between −π/2 and 0, e.g., $\theta_1$ in FIG. 15. If the calculated phase difference is negative, i.e., the element to the right lags the element to the left in phase the angle $\theta$ can be between $\pi/2$ and $\pi$, the angle can also be between $-\pi$ and $-\pi/2$, e.g., $\theta_2$ in FIG. 15.

In one example, if the number of receive antennas is more than 2 (N>2), a TRP can calculate N−1 phase difference between each two adjacent elements, e.g., $\Delta\phi_1$, $\Delta\phi_2$, . . . , $\Delta\phi_{N-1}$. In one example, a TRP can calculate an average phase difference $\Delta\phi$ as:

In one example, $$\Delta\phi = \frac{1}{N-1}\Sigma_{n=1}^{N-1}\Delta\phi_n$$

In one example, $$\exp(i2\pi\Delta\phi) = \frac{1}{N-1}\Sigma_{n=1}^{N-1}\exp(i2\pi\Delta\phi_n)$$

The angle $\Delta\phi$ can be used to calculate angle $\theta'$ as aforementioned.

In another example, angle $\theta'$ is calculated for each $\Delta\phi_n$ as aforementioned. The calculated $\theta'_n$ values are then averaged to get $\theta'$, i.e., $$\theta' = \frac{1}{N-1}\Sigma_{n=1}^{N-1}\Delta\theta'_n.$$

In one example, if $\theta'_1$ is determined for TRP1 using one of the aforementioned examples, and $\theta'_2$ is determined TRP2 using one of the aforementioned examples, a position of a UE, with respect to the TRPs, can be determined as follows:

If $\alpha$=0, i.e., the x-axis is parallel to the x'-axis. $\theta_1=\theta'_1$ and $\theta_2=\theta'_2$.

$x_1$ and $y_1$ are the x and y positions of the UE relative to TRP1. $y_1=x_1 \tan \theta_1$ $x_2$ and $y_2$ are the x and y positions of the UE relative to TRP2. $y_2=x_2 \tan \theta_2$ In the example of FIG. 15, the two TRPs are on the X axis and separated by a distance D. Therefore, $y_1=y_2$ and $x_1-x_2=D$. Therefore, $x_1 \tan \theta_1=(x_1-D) \tan \theta_2$. Hence, $$x_1 = \frac{D\tan\theta_2}{\tan\theta_2 - \tan\theta_1}.$$

The other distances can be readily calculated using the aforementioned equations.

In one example, if $\theta'_1$ is determined for TRP1 using one of the aforementioned examples, and $\theta'_2$ is determined TRP2 using one of the aforementioned examples, and $\theta'_3$ is determined TRP3 using one of the aforementioned examples, a position of a UE, with respect to the TRPs, can be determined as follows:

The x-axis and the x'-axis are at an angle $\alpha$ to each other. $\theta_1=\theta'_1-\alpha$ and $\theta_2=\theta'_2-\alpha$ and $\theta_3=\theta'_3-\alpha$.

$x_1$ and $y_1$ are the x and y positions of the UE relative to TRP1. $y_1=x_1 \tan \theta_1$ $x_2$ and $y_2$ are the x and y positions of the UE relative to TRP2. $y_2=x_2 \tan \theta_2$ $x_3$ and $y_3$ are the x and y positions of the UE relative to TRP3. $y_3=x_3 \tan \theta_3$ In this example, the three TRPs are on the X axis and separated by a distance D. Therefore, $y_1=y_2=y_3$ and $x_1-x_2=x_2-x_3=D$. Therefore, $x_1 \tan \theta_1=(x_1-D) \tan \theta_2$. Therefore, $\cot(\theta'_1-\alpha)-\cot(\theta'_2-\alpha)=\cot(\theta'_2-\alpha)-\cot(\theta'_3-\alpha)$. Using, the last equation we can calculate $\alpha$. Then as previously described, $$x_1 = \frac{D\tan\theta_2}{\tan\theta_2 - \tan\theta_1}.$$

The other distances can be readily calculated using the aforementioned equations.

In this configuration, the three TRPs are assumed to be co-linear and on one side of the road, other examples can be considered where the TRPs are not co-linear (e.g., in different sides of the road).

In one example, a UE may report one or more of the following information to the LMF or to one or more TRPs:

The measured phase difference between each two receive antenna elements per TRP.

The averaged phase difference using one of the aforementioned examples per TRP.

The calculated angle $\theta'$, as aforementioned, using the measured phase difference between each two receive antenna elements per TRP.

The calculated angle $\theta'$, as aforementioned, using the averaged phase difference using one of the aforementioned examples per TRP.

The averaged angle $\theta'$, as aforementioned.

In one example, a TRP may report one or more of the following information to the LMF or to other TRPs or to the UE:

The position of the TRP (e.g., latitude, longitude and/or elevation).

In one example, a UE may report one or more of the following information to the LMF or the TRPs:

The distance between antenna elements.

The structure of the antenna elements (e.g., 1-D (linear) or 2-D (planer), etc.).

The orientation of the antenna elements relative to the x-y axis (e.g., latitude-longitude axis).

The orientation of the axis used to report $\theta$.

In one example, a TRP can be a device capable of receiving and/or transmitting positioning reference signals as well as other types of UL and DL traffic.

In one example, a TRP can be a device capable of only receiving and/or transmitting positioning reference signals.

A UE is moving at a velocity v and is receiving a positioning reference signal in the downlink direction, e.g., the UE is receiving a DL PRS from multiple TRPs. Due to the motion of the UE, the receptions in different slots appear as if they are from a virtual receive antenna array with a separation between the virtual antenna elements of d=vT, where T is the time from start of reception of DL PRS to the start of a next reception of DL PRS from a TRP. For example, if the number of slots between consecutive DL PRS is N slots, $T=NT_s$, where $T_s$ is the slot duration. For example, consider a UE moving at speed of 108 km/h (about 67.5 mph), or 30 m/s. If the subcarrier spacing is 30 kHz, the slot duration is $T_s$=0.5 ms, if the number of slots between consecutive positioning reference signal transmissions is 4 slots, d=30·(4·0.5)=60 mm, this represents $\lambda/2$ for a wave with frequency 2.5 GHz. The number of slots between consecutive DL PRS from a TRP used for phase difference estimation can be adjusted based on the speed of the UE. In one example, N (number of slots or number of symbols between consecutive DL PRS from a TRP) or T (time between consecutive DL PRS from a TRP) can be specified in the system specifications and/or configured or updated by RRC signaling and/or MAC CE signaling and/or L1 control signaling. The transmitted signals in different slots can be synchronized in phase or have a fixed phase difference.

A UE receives a DL PRS in the downlink direction at different times (e.g., in different slots) to create a virtual receive antenna array.

The UE can be configured to receive the DL PRS from multiple TRPs. Wherein the transmitted DL PRS from different TRPs are orthogonal or quasi-orthogonal. The orthogonality can be in time domain, i.e., different TRPs transmit in different time intervals (e.g., different symbols or different slots or different subframes, . . . ), and/or frequency domain, i.e., different TRPs transmit in different frequency intervals (e.g., in different sub-carriers, or in different PRBs or using different comb shifts (comb offsets), . . . ), and/or code domain, i.e., different TRPs transmit using sequences that are orthogonal or quasi-orthogonal to each other.

The configuration of the DL PRS can include:

Time domain resources, e.g., number of symbols and starting position (e.g., starting symbol) within a slot of DL PRS.

Time domain behavior, whether transmission is aperiodic, semi-persistent or periodic transmission, including periodicity for semi-persistent and periodic transmissions.

Frequency domain resources, e.g., starting position in frequency domain (e.g., FD shift), and length in frequency domain (e.g., number of PRBs or C-SRS).

Transmission comb related information. Number of transmission combs and transmission comb offset.

Code domain information, e.g., sequence ID, and group or sequence hopping type (e.g., neither, groupHopping or sequenceHopping).

Some of the aforementioned parameters can be common across the multiple TRPs, e.g., configured with a common configuration, and some can be distinct, e.g., specific for each TRP.

In one example, the reception of the DL PRS at the UE is Omni-directional, e.g., a same spatial receive filter can receive transmissions from multiple TRPs.

In one example, the reception of the DL PRS at the UE from different TRPs is on separate beams wherein a reception on a beam is from to one or more TRPs.

FIG. 16 illustrates an example of reception of the DL positioning reference signal 1600 according to embodiments of the present disclosure. The embodiment of the reception of the DL positioning reference signal 1600 illustrated in FIG. 16 is for illustration only. FIG. 16 does not limit the scope of this disclosure to any particular implementation of the reception of the DL positioning reference signal 1600.

As illustrated in FIG. 16, the DL PRS can be transmitted by more than one TRP. In one example, UE can receive the DL PRS from a TRP at different slots as illustrated in FIG. 16. In one example as illustrated in FIG. 16, we take the direction of motion of the UE (the direction of virtual receive antenna array) as the x'-axis. The line connecting the TRPs is the x-axis. In one example, the angle between the x'-axis and the x-axis is $\alpha$ as illustrated in FIG. 16. In one example, $\alpha$ can be 0, for example the UE can be a car UE travelling along a road the direction of travel of the car UE (or the direction of the virtual receive antenna array) is parallel to the road (direction of travel) and TRPs are installed along the road, the line connecting the TRPs is parallel to the road.

The signal is transmitted from each TRP, and it arrives at the UE antenna at different times, due to the different travel time from the transmit antenna of each TRP to the receive antenna of the UE transmitted in different slots, there is phase difference between the two rays arriving at UE's antenna in two different slots or symbols. This phase difference can be expressed as:

$$\frac{2\pi}{\lambda} vT \cos \theta'.$$

Wherein, $\lambda$ is the wavelength of the carrier frequency, vT is the separation between the antenna elements at different transmit times as illustrated in FIG. 16, $\theta'$ is the angle to the x'-axis as illustrated in FIG. 16, the x'-axis for example can be the line joining the antenna elements or the direction of travel of the UE. In one example, the phase difference is calculated as the phase from the first reception minus the phase from next reception, if the calculated phase difference is positive, the angle $\theta'$ can be between 0 and $\pi/2$, the angle can also be between $-\pi/2$ and 0, e.g., $\theta_1$ in FIG. 16. If the calculated phase difference is negative, the angle $\theta'$ can be between $\pi/2$ and $\pi$, the angle can also be between $-\pi$ and $-\pi/2$, e.g., $\theta_2$ in FIG. 16.

In one example, if the number of instances (slots) of positioning reference signal transmission used for phase and angle estimation is more than 2 (N>2), a TRP can calculate N−1 phase differences between each two adjacent transmissions, e.g., $\Delta\phi_1, \Delta\phi_2, \ldots, \Delta\phi_{N-1}$. Wherein, N can be specified in the system specifications and/or configured or updated by RRC signaling and/or MAC CE signaling and/or L1 control information. In one example, a TRP can calculate an average phase difference $\phi\Delta$ as:

In one example, $$\Delta\phi = \frac{1}{N-1} \sum_{n=1}^{N-1} \Delta\phi_n.$$

In one example, $$\exp(i2\pi\Delta\phi) = \frac{1}{N-1} \sum_{n=1}^{N-1} \exp(i2\pi\Delta\phi_n).$$

The angle $\Delta\phi$ can be used to calculate angle $\theta'$ as aforementioned.

In another example, angle $\theta'_i$ is calculated for each $\Delta\phi_i$ as aforementioned. The calculated $\theta'_i$ values are then averaged to get $\theta'$, i.e., $$\theta' = \frac{1}{N-1} \sum_{n=1}^{N-1} \Delta\theta'_n.$$

In one example, the speed of the UE, v, is known and the angle $\theta'$ is calculated as aforementioned using the speed.

In one example, of the speed of the UE, v, is unknown, the speed is estimated along with the other parameters. One of more of the following can be unknown, The speed of the UE The direction of travel of the UE The position of the UE relative to one of the TRPs. This is represented by two unknowns x and y.

Depending on the number of unknowns, a number of TRP phase measurements at the UE can be made. For example, with two knowns, e.g., x and y, phase difference measurements of signals transmitted by TRP1 and TRP2 can be used to estimate the unknown positions x and y. In another example, with three unknowns, e.g., x and y and either speed of the UE or the direction of the travel, phase difference measurements of signals transmitted by TRP1, TRP2 and TRP3 can be used to estimate the unknown positions x and y and either speed of the UE or the direction of the travel. In another example, with four unknowns, e.g., x, y, speed of the UE and the direction of the travel, phase difference measurements of signals transmitted by TRP1, TRP2, TRP3 and TRP4 can be used to estimate the unknown positions x, y, speed of the UE and the direction of the travel.

In one example, if the speed of the UE is unknown, and α=0, the direction of travel is parallel to the direction of the line connecting the TRPs.

$$\Delta\varphi_1 = \frac{2\pi}{\lambda}vT\cos\theta'_1,\ \text{therefore},\ \cot\theta_1 = \cot\theta'_1 = \frac{2\pi vT}{\sqrt{-(2\pi vT)^2 + (\lambda\Delta\varphi_1)^2}}$$

$$\Delta\varphi_2 = \frac{2\pi}{\lambda}vT\cos\theta'_2,\ \text{therefore},\ \cot\theta_2 = \cot\theta'_2 = \frac{2\pi vT}{\sqrt{-(2\pi vT)^2 + (\lambda\Delta\varphi_2)^2}}$$

$$\Delta\varphi_3 = \frac{2\pi}{\lambda}vT\cos\theta'_3,\ \text{therefore},\ \cot\theta_3 = \cot\theta'_3 = \frac{2\pi vT}{\sqrt{-(2\pi vT)^2 + (\lambda\Delta\varphi_3)^2}}$$

Using the analysis presented herein, it can be found that $$x_1 = \frac{D\tan\theta_2}{\tan\theta_2 - \tan\theta_1} = \frac{2D\tan\theta_3}{\tan\theta_3 - \tan\theta_1}.$$

By subsisting for $\tan\theta_1$, $\tan\theta_2$ and $\tan\theta_3$ from the above equations, the value of v and $x_1$ can be found. The other distances can be readily calculated using the aforementioned equations.

In one example, if $\theta'_1$ is determined for TRP1 using one of the aforementioned examples, and $\theta'_2$ is determined for TRP2 using one of the aforementioned examples, a position of a UE can be determined as follows:

If α=0, i.e., the x-axis is parallel to the x'-axis. $\theta_1=\theta'_1$ and $\theta_2=\theta'_2$.

$x_1$ and $y_1$ are the x and y positions of the UE relative to TRP1. $y_1=x_1 \tan\theta_1$.

$x_2$ and $y_2$ are the x and y positions of the UE relative to TRP2. $y_2=x_2 \tan\theta_2$.

In the example of FIG. 16, the two TRPs are on the X axis and separated by a distance D. Therefore, $y_1=y_2$ and $x_1-x_2=D$. Therefore, $x_1 \tan\theta_1=(x_1-D) \tan\theta_2$. Hence, $$x_1 = \frac{D\tan\theta_2}{\tan\theta_2 - \tan\theta_1}.$$

The other distances can be readily calculated using the aforementioned equations.

FIG. 17 illustrates an example of a virtual receive antenna array as result of the UE's mobility 1700 according to embodiments of the present disclosure. The embodiment of the virtual receive antenna array as result of the UE's mobility 1700 illustrated in FIG. 17 is for illustration only. FIG. 17 does not limit the scope of this disclosure to any particular implementation of the virtual receive antenna array as result of the UE's mobility 1700.

As illustrated in FIG. 17, if the DL PRS occurs every T seconds, and the UE is moving at a speed v, the distance between two carrier phase measurements is d=v T. The presence of the UE at different positions over time creates a virtual receive antenna array that can be leveraged for phase difference measurements and accordingly calculating the direction of travel of the radio wave.

In one example, a UE may report one or more of the following information to the LMF or one or more TRPs:

The measured phase difference from two consecutive reception instances separated by time T per TRP.

The averaged phase difference using one of the aforementioned examples per TRP.

The calculated angle θ', as aforementioned, using the measured phase difference from two consecutive receptions of positioning reference signal per TRP.

The calculated angle θ', as aforementioned, using the averaged phase difference using one of the aforementioned examples per TRP.

The averaged angle θ', as aforementioned.

In one example, a TRP may report one or more of the following information to the LMF or to other TRPs or to the UE:

The position of the TRP (e.g., latitude, longitude and/or elevation).

The initial phase of each transmission or the phase difference between transmissions.

In one example, a UE may report one or more of the following information to the LMF or the TRPs:

Speed of travel.

The direction of travel.

In one example, a TRP can be a device capable of receiving and/or transmitting positioning reference signals as well as other types of UL and DL traffic.

In one example, a TRP can be a device capable of only receiving and/or transmitting positioning reference signals.

Figure 18:
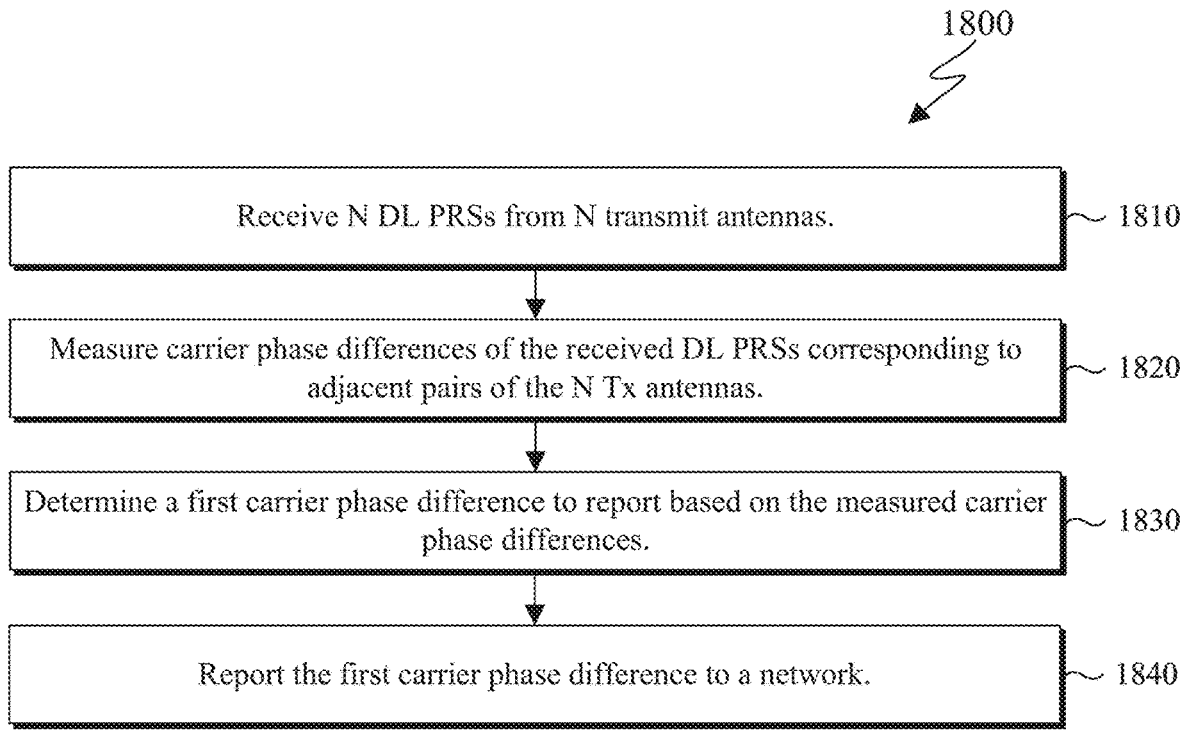
FIG. 18 illustrates an example method performed by a UE in a wireless communication system according to embodiments of the present disclosure.

FIG. 18 illustrates an example method 1800 performed by a UE in a wireless communication system according to embodiments of the present disclosure. The method 1800 of FIG. 18 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1800 is for illustration only and other embodiments can be used without departing from the scope of the present disclosure.

The method 1800 begins with the UE receiving N DL PRSs (1810). For example, in 1810, the DL PRSs are received in orthogonal or quasi-orthogonal resources from N transmit antennas of a base station, respectively, where N>1. For example, the orthogonal resources for the DL PRSs are different comb offsets for the DL PRSs or different symbols in a slot for the DL PRSs or different slot.

The UE then measures first carrier phase differences of the received DL PRSs corresponding to adjacent pairs of the N transmit antennas (1820). For example, the UE may receive, on M receive antennas, a DL PRS from the DL PRSs, where M>1, and measure a carrier phase difference of the DL PRS between each pair of consecutive antennas of the M receive antennas. The UE may then determine an angle of arrival based on the measured carrier phase difference and report the angle of arrival to the network (e.g., LMF or gNB).

The UE then determines a first carrier phase difference based on the N transmit antennas to report based on the measured first carrier phase differences (1830) and reports the first carrier phase difference to a network (1840). For example, the UE may measure a first carrier phase of a DL PRS from the DL PRSs in a first slot and a second carrier phase of the DL PRS in a second slot, determine a second carrier phase difference between the first carrier phase and the second carrier phase, and report the second carrier phase difference to the network.

In various embodiments, the UE may also transmit M SRSs on M antennas for BS measurement and reporting (e.g., as discussed in connection with FIG. 19 below), where M>1 and the M SRSs are transmitted on orthogonal or quasi-orthogonal resources. For example, the orthogonal resources for the SRSs are different comb offsets for the SRSs or different symbols in a slot for the SRSs or different slots.

Figure 19:
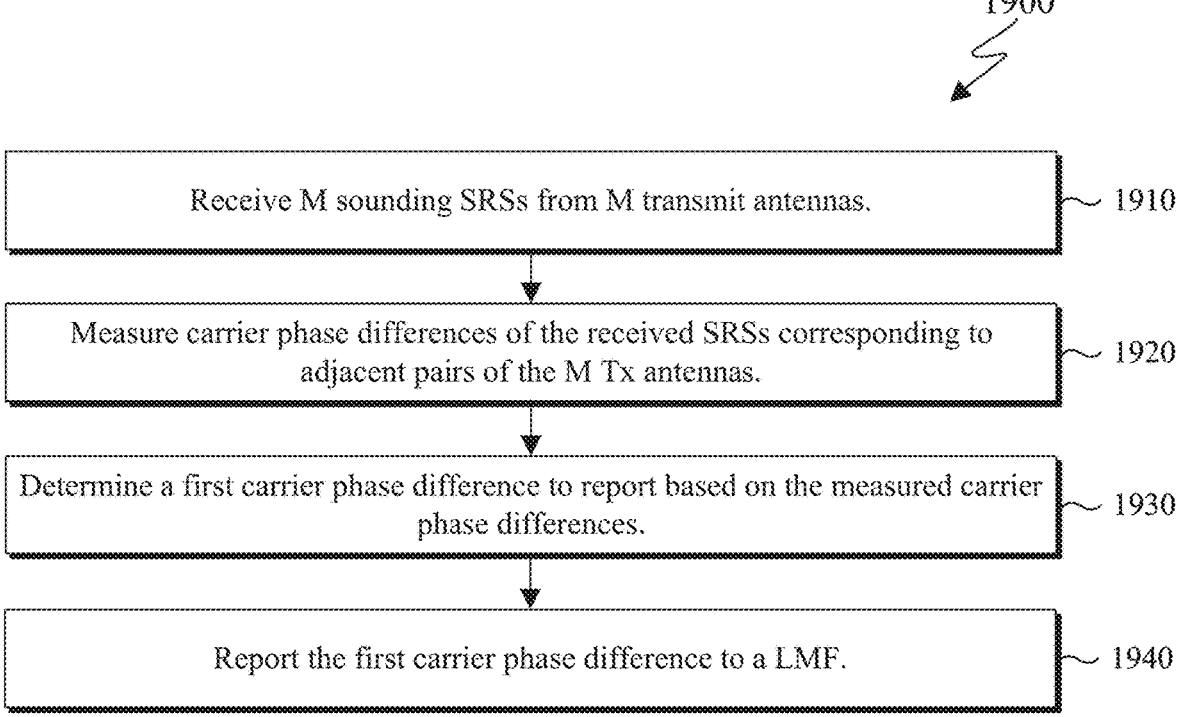
FIG. 19 illustrates an example method performed by a BS in a wireless communication system according to embodiments of the present disclosure.

FIG. 19 illustrates an example method 1900 performed by a BS in a wireless communication system according to embodiments of the present disclosure. The method 1900 of FIG. 19 can be performed by any of the BSs 101-103 of FIG. 1, such as BS 102 of FIG. 2, and a corresponding method can be performed by any of the UEs 111-116 of FIG. 1, such as the UE 116 of FIG. 3. The method 1900 is for illustration only and other embodiments can be used without departing from the scope of the present disclosure.

The method 1900 begins with the BS receiving M sounding SRSs (1910). For example, in 1910, the SRSs are received in orthogonal or quasi-orthogonal resources from M transmit antennas of a UE, respectively, where M>1. For example, the orthogonal resources for the SRSs are different comb offsets for the SRSs or different symbols in a slot for the SRSs or different slots.

The BS then measures a first carrier phase differences of the received SRSs corresponding to adjacent pairs of the M transmit antennas (1920). For example, in 1920, the BS may receive, on N receive antennas, a SRS from the SRSs, where N>1, and measure a second carrier phase difference of the SRS between each pair of consecutive antennas of the N receive antennas. In various embodiments, the BS may determine an angle of arrival based on the measured second carrier phase difference and report the angle of arrival the LMF.

The BS then determines a first carrier phase difference to report based on the measured first carrier phase differences (1930) and reports the first carrier phase difference to a LMF (1940). For example, the BS may measure a first carrier phase of a SRS from the SRSs in a first slot and a second carrier phase of the SRS in a second slot, determine a second carrier phase difference between the first carrier phase and the second carrier phase, and report the second carrier phase difference to the LMF.

In various embodiments, the BS may also transmit N DL PRSs on N antennas for UE measurement and reporting (e.g., as discussed in connection with FIG. 18 above), where N>1 and the N DL PRSs are transmitted on orthogonal or quasi-orthogonal resources. For example, the orthogonal resources for the DL PRSs are different comb offsets for the DL PRSs or different symbols in a slot for the DL PRSs or different slots.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment and base stations, various changes may be made to the figures. For example, the user equipment and base station can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
   a transceiver; and
   a processor coupled with the transceiver and configured to:
   receive, from N antennas of a base station, N downlink (DL) positioning reference signals (PRSs), respectively, wherein the DL PRSs are received in orthogonal resources and N>1,
   measure, based on the N DL PRSs, carrier phase differences corresponding to adjacent pairs of the N antennas, wherein information on a first distance between adjacent pairs of the N antennas is received from the base station,
   determine, based on the first distance and the carrier phase differences, angle values corresponding to the carrier phase differences,
   determine a first carrier phase difference to report based on averaging M carrier phase differences corresponding to M slots among the carrier phase differences,
   determine a first angle value to report based on averaging M angle values corresponding to the M slots among the angle values, and
   report, to the base station, the first carrier phase difference and the first angle value,
   wherein information on M is received from the base station.

2. The UE of claim 1, wherein the orthogonal resources for the DL PRSs are:
   different comb offsets for the DL PRSs, or
   different symbols in a slot for the DL PRSs.

3. The UE of claim 1, wherein the processor is further configured to:
   receive, on Y antennas, a DL PRS from the DL PRSs, where Y>1; and
   measure a second carrier phase difference of the DL PRS between each pair of consecutive antennas of the Y antennas.

4. The UE of claim 3, wherein the processor is further configured to;

determine an angle of arrival based on the measured second carrier phase difference and a second distance between each pair of consecutive antennas of the Y antennas; and report the angle of arrival to the base station, wherein information on the second distance is transmitted to the base station.

5. The UE of claim 1, wherein:

the processor is further configured to transmit, to the base station, P sounding reference signals (SRSs) on P antennas, P>1, and the P SRSs are transmitted on orthogonal resources.

6. The UE of claim 5, wherein the orthogonal resources for the SRSs are:

different comb offsets for the SRSs, or different symbols in a slot for the SRSs.

7. A base station (BS) comprising:

a transceiver; and a processor coupled with the transceiver and configured to transmit, to a user equipment (UE) on N antennas of the BS, N downlink (DL) positioning reference signals (PRSs), respectively, wherein the DL PRSs are received in orthogonal resources and N>1, and receive, from the UE, a first carrier phase difference and a first angle value, wherein the first carrier phase difference corresponds to an average of M carrier phase differences corresponding to M slots among carrier phase differences, wherein the carrier phase differences are based on adjacent pairs of the N antennas, wherein information on a first distance between adjacent pairs of the N antennas is transmitted to the UE by the BS, wherein the first angle value corresponds to an average of M angle values corresponding to the M slots among angle values, wherein the angle values are based on the first distance and the carrier phase differences, and wherein information on M is transmitted to the UE by the BS.

8. The BS of claim 7, wherein the orthogonal resources for the DL-PRSs are:

different comb offsets for the DL-PRSs, or different symbols in a slot for the DL-PRSs.

9. The BS of claim 7, wherein:

the processor is further configured to receive P sounding reference signals (SRSs) from P antennas of the UE, P>1, and the P SRSs are transmitted on orthogonal resources.

10. The BS of claim 9, wherein the orthogonal resources for the SRSs are:

different comb offsets for the SRSs, or different symbols in a slot for the SRSs.

11. A method performed by a user equipment (UE), the method comprising:

receiving, from N antennas of a base station, N downlink (DL) positioning reference signals (PRSs), respectively, wherein the DL PRSs are received in orthogonal resources and N>1;

measuring, based on the N DL PRSs, carrier phase differences corresponding to adjacent pairs of the N antennas, wherein information on a first distance between adjacent pairs of the N antennas is received from the base station;

determining, based on the first distance and the carrier phase differences, angle values corresponding to the carrier phase differences;

determining a first carrier phase difference to report based on averaging M carrier phase differences corresponding to M slots among the carrier phase differences;

determining a first angle value to report based on averaging M angle values corresponding to the M slots among the angle values; and reporting, to the base station, the first carrier phase difference and the first angle value, wherein information on M is received from the base station.

12. The method of claim 11, wherein the orthogonal resources for the DL PRSs are:

different comb offsets for the DL PRSs, or different symbols in a slot for the DL PRSs.

13. The method of claim 11, further comprising:

receiving, on Y antennas, a DL PRS from the DL PRSs, where Y>1; and measuring a second carrier phase difference of the DL PRS between each pair of consecutive antennas of the Y antennas.

14. The method of claim 13, further comprising:

determining an angle of arrival based on the measured second carrier phase difference and a second distance between each pair of consecutive antennas of the Y antennas; and reporting the angle of arrival to the base station, wherein information on the second distance is transmitted to the base station.

* * * * *